United States Patent [19]

Agnor et al.

[11] 4,417,246
[45] Nov. 22, 1983

[54] PAGING RECEIVER HAVING A SERIAL CODE PLUG

[75] Inventors: William C. Agnor, Lynchburg; James H. Elder, Brookneal, both of Va.

[73] Assignee: General Electric Company, Lynchburg, Va.

[21] Appl. No.: 204,277

[22] Filed: Nov. 5, 1980

Related U.S. Application Data

[63] Continuation-in-part of Ser. No. 95,447, Nov. 19, 1979, abandoned.

[51] Int. Cl.³ .............................................. G08B 5/22
[52] U.S. Cl. ........................... 340/825.44; 340/825.48; 455/36; 455/343
[58] Field of Search ...................... 340/825.44, 825.45, 340/825.48, 311.1; 455/31, 35, 36, 37, 227, 453; 179/2 EB, 2 EC

[56] References Cited

U.S. PATENT DOCUMENTS

| | | | |
|---|---|---|---|
| 3,670,042 | 6/1972 | McGarvey | 455/36 |
| 3,766,523 | 10/1973 | Brocker et al. | 340/171 PF |
| 3,769,593 | 10/1973 | Williams | 340/825.44 |
| 3,882,466 | 5/1975 | Poorvin | 340/311 |
| 4,068,177 | 1/1978 | Gillis | 340/311 |
| 4,103,286 | 7/1978 | Nicolini et al. | 340/311 |
| 4,181,893 | 1/1980 | Ehmke | 455/36 |
| 4,194,153 | 3/1980 | Masaki et al. | 340/311 |

Primary Examiner—James J. Groody
Attorney, Agent, or Firm—Cushman, Darby and Cushman

[57] ABSTRACT

A paging receiver selectively operable in either a six tone battery saving mode or in a five tone non-battery saving mode. The receiver features a serial code plug for programming a programmable tone detector to be responsive to a specific paging receiver address comprising a predetermined combination of preamble and paging signals. The use of a serial code plug in place of the parallel code plug previously known and utilized in the industry allows a reduced complexity of the paging receiver and a corresponding size, weight and cost savings.

75 Claims, 18 Drawing Figures

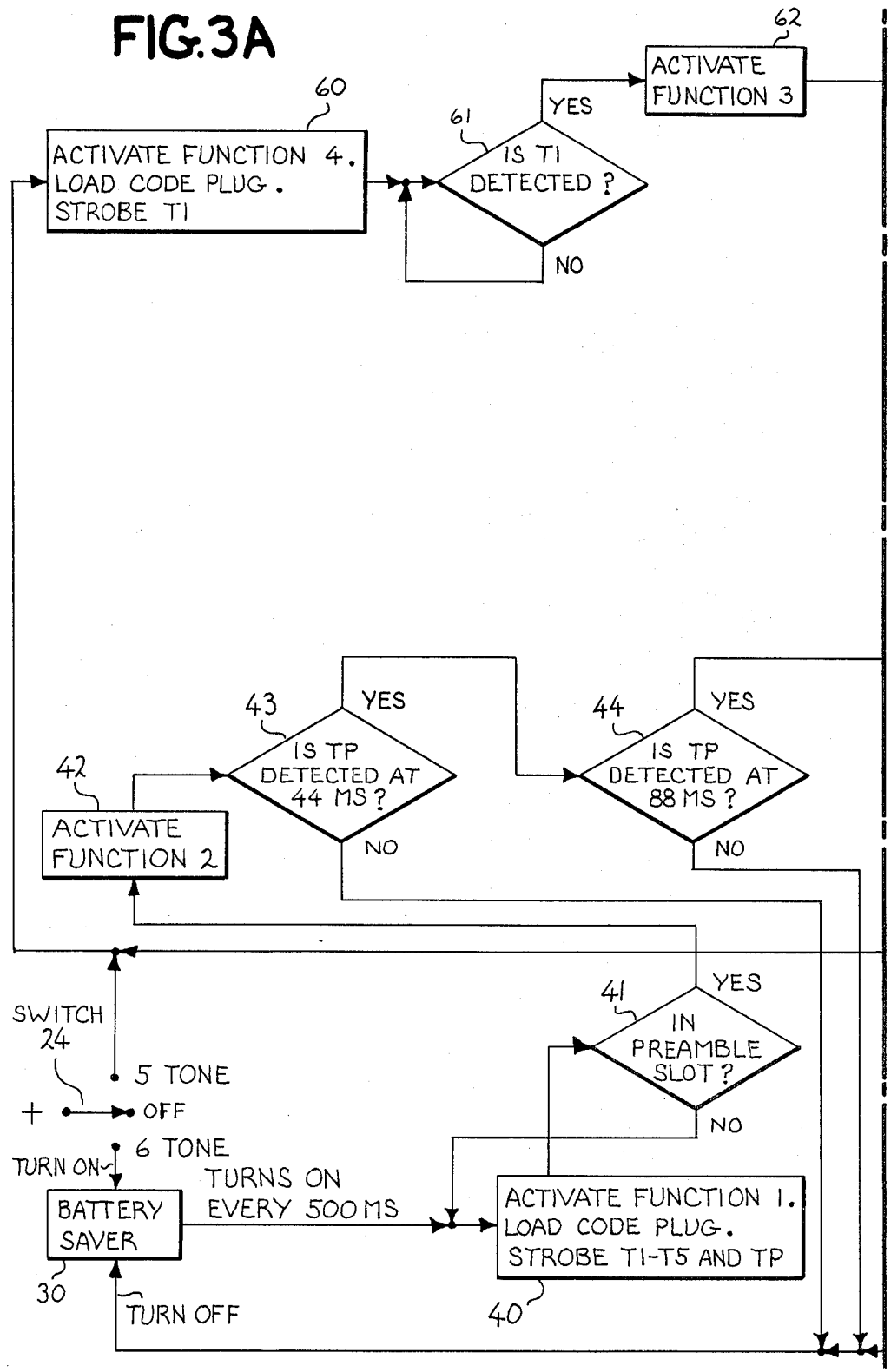

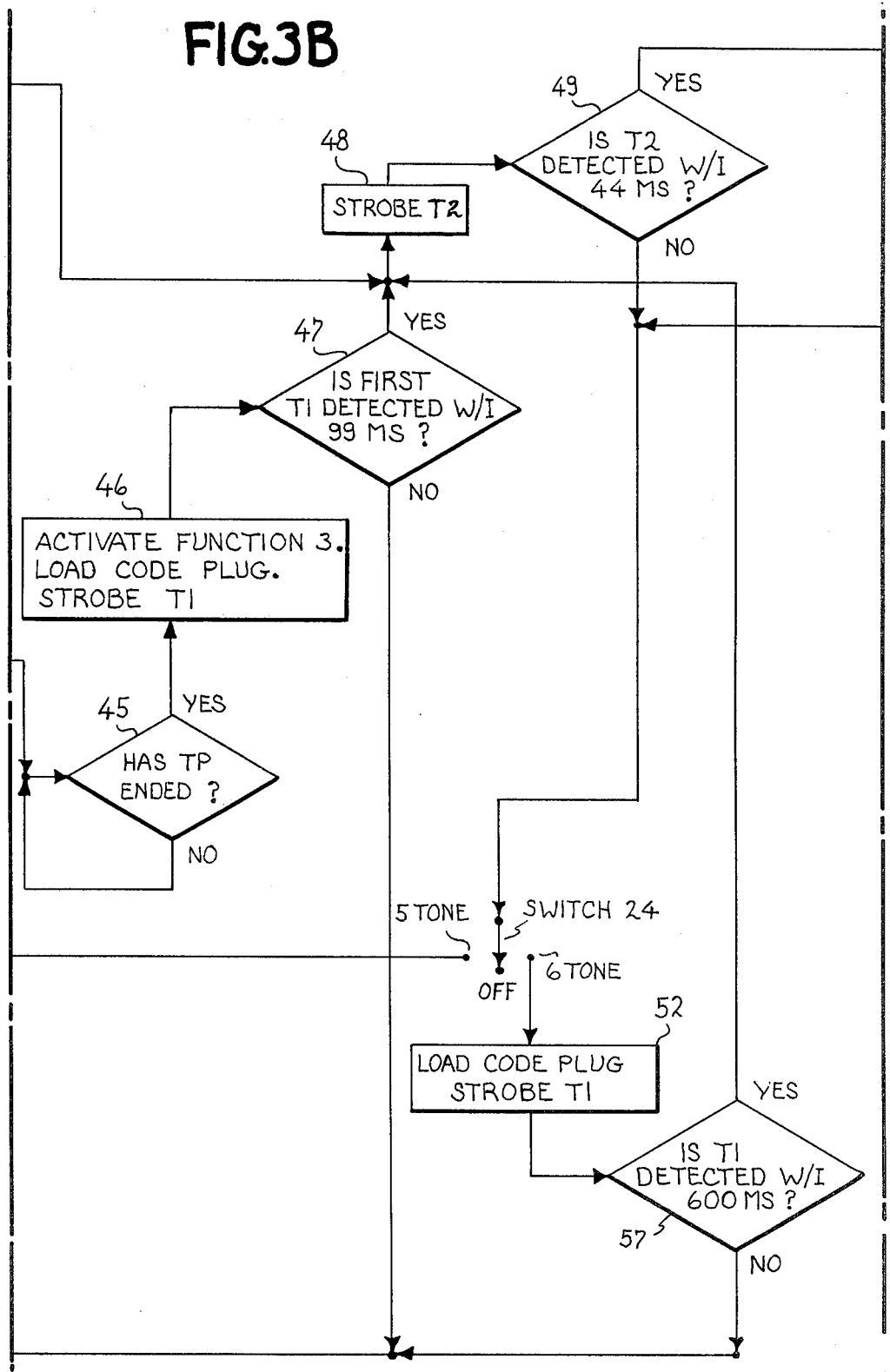

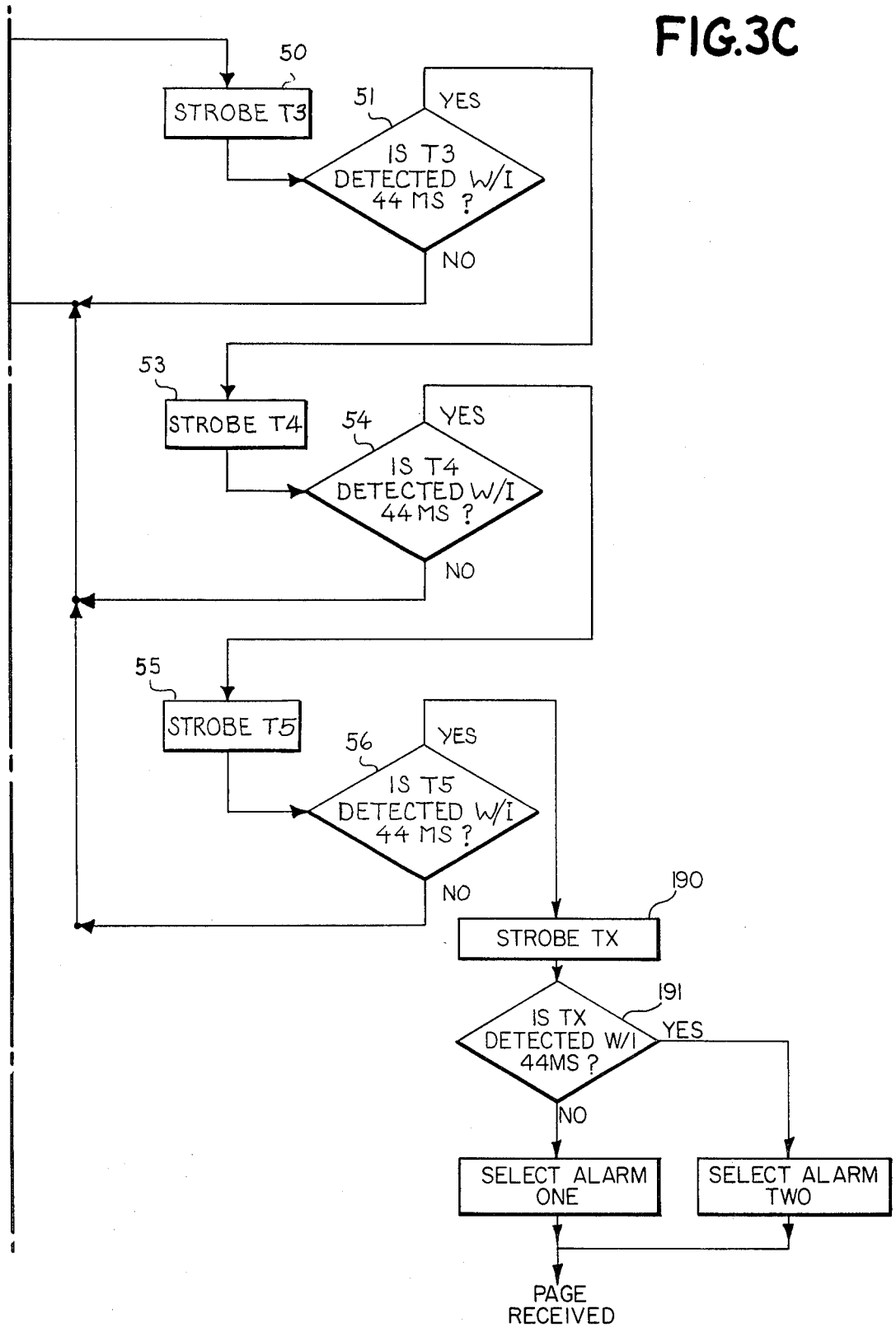

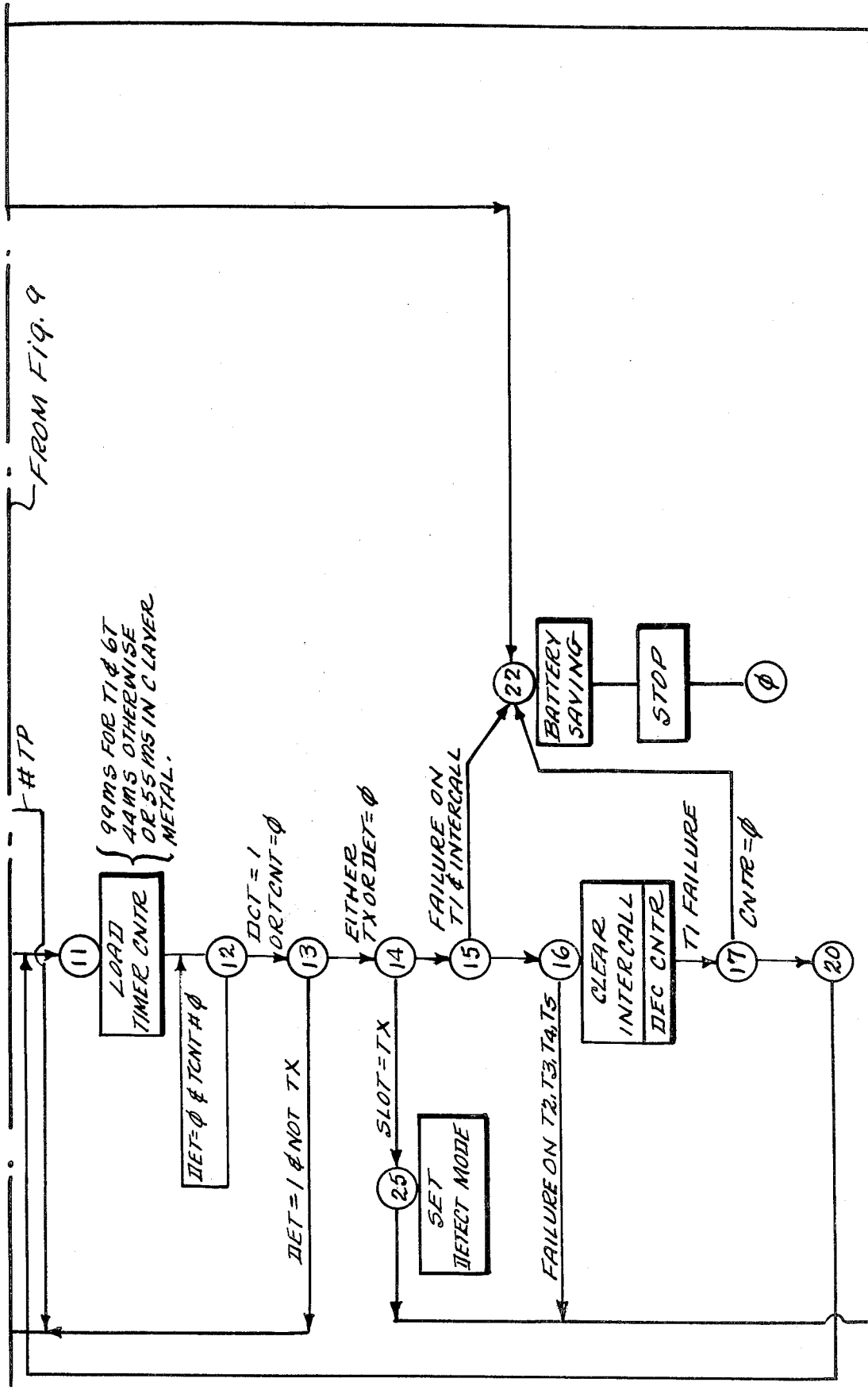

PAGING RECEIVER HAVING A SERIAL CODE PLUG

RELATED APPLICATION

This application is a continuation-in-part of application Ser. No. 095,447 filed on Nov. 19, 1979 now abandoned.

BACKGROUND OF THE INVENTION

This invention relates generally to paging radio receivers. More specifically, this invention is directed to a paging receiver that is capable of selectively receiving a plurality of sequential tones which may or may not be preceded by a preamble tone.

Paging radio receivers are used to alert a user (a subscriber to a radio paging system). Upon receipt of a page, a user carries out some pre-arranged activity, such as calling his office to receive a telephone message. A paging message for a particular receiver is provided by transmitting from a central facility a sequence of signals, usually tones of selected frequencies in the audio range, on a radio carrier. The particular frequencies transmitted in the sequence constitute the address of a specific paging receiver and are detected by only a specific receiver arranged to detect the particular frequencies in that sequence. When the particular frequencies in that sequence are detected, the paging receiver produces a paging signal (also referred to as a "page") to alert the user that his attention is required. The user can then call a prearranged number, or perform a prearranged duty. Thus, paging receivers provide a useful function for people in many types of occupations and vocations.

Paging receivers now in common use do not take full advantage of the availability of mass production of binary circuits in the form of microcircuits. Thus, they are not as compact and functional as they could be.

Furthermore, some paging receivers utilize a battery saving device that repeatedly turns the receiver on to listen for a paging signal or transmission. Such a receiver requires a preamble (usually a tone) to be transmitted so as to enable the receiver to be active when the sequential paging tones are transmitted. Without a battery saving device, a paging receiver is kept on at all times to listen for its sequence of tones.

Thus, some paging systems operate with a six (6) tone slot format including a preamble and other systems operate with a five (5) tone slot format. The six tone format permits the use of the "battery saving" type paging receiver. At the present time, it is necessary to use a paging receiver compatible with the paging system within which it operates. Thus, it would be desirable to have a paging receiver selectively operable in either format.

SUMMARY OF THE INVENTION

There is, therefore, provided an improved paging receiver. The paging receiver according to the present invention takes advantage of binary microcircuit design in order to provide a compact, highly functional device. Its unique circuit arrangement permits selective operation in either a six (6) signal (tone) battery saving mode or in a five (5) signal (tone) non-battery saving mode. The paging receiver includes a "front end" R.F. and audio circuit for receiving and demodulating preamble and paging tones from received radio signals. A digital tone detector (programmable signal detection means) is coupled to the demodulated output of the R.F. and audio circuit. Control means are provided that initially program the digital tone detector for passing a predetermined sequence of paging tones. Thereafter, the control means programs the digital tone detector for passing a predetermined preamble tone. (In a conventional six (6) tone format, a preamble tone and a sequence of five (5) paging tones define the address of a specific paging receiver. In the five (5) tone non-battery saving format, five (5) paging tones alone define the address of a specific paging receiver.) If the predetermined preamble tone is detected, at a first point in time, there is an attempt to detect the preamble tone again at a second point in time. If the preamble tone is detected at this second point in time, the control means looks for the end of the preamble. At the end of the preamble, the predetermined control means again programs the filter means for the predetermined sequence of paging tones. With control means that initially program for the paging tones, followed by programming for the preamble tone, and then followed by programming for the paging tones, the paging receiver can be arranged to efficiently and rapidly detect either the six tone slot format of a battery save system or the five tone slot format of a non-battery save system. Finally, means are connected to the control means for producing a page in response to the proper predetermined preamble tone and paging tones being received (in a six (6) tone format system), or in response to the predetermined sequence of paging signal tones being received (in a five (5) tone format system).

BRIEF DESCRIPTION OF THE DRAWINGS

The subject matter regarded as the invention is particularly pointed out and distinctly defined by the claims. The structure and operation of the presently preferred embodiment of the invention, together with further objects and advantages, may be better understood from the following detailed description given in connection with the accompanying drawings, wherein:

FIG. 3 including parts 3A, 3B and 3C is a functional flow chart explaining the operation of the paging receiver in accordance with the present invention;

DESCRIPTION OF THE PREFERRED EMBODIMENT

Background

Figure 1:
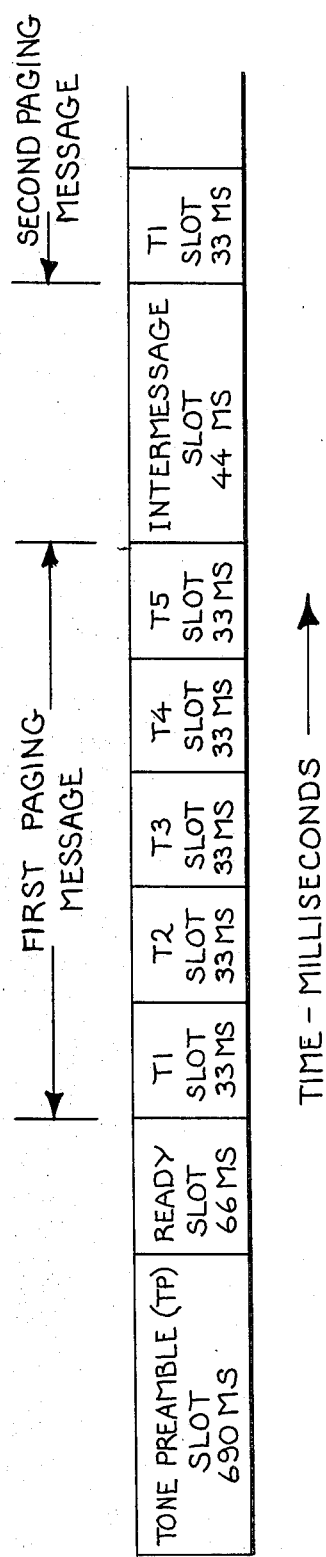
FIG. 1 shows an example of sequential tones for which the paging receiver according to the present invention is intended.

With reference to FIG. 1, there is shown the tone format (as a function of time) for which the paging receiver according to the present invention is intended. The various tones are transmitted by a radio frequency carrier that is suitably modulated. However, it is to be understood that the invention is not limited to any specific tone format and that tone formats other than as illustrated may be used, and the receiver can be redesigned to receive such other tone formats. In addition, the invention is not limited to "tones" per se, but rather can be adapted to receive and respond to other types of paging signals. "Tone" is used throughout this description only because conventional systems employ audio tones. For paging messages intended to be used with receivers having a battery saving function, the tone format begins with a tone preamble (hereinafter abbreviated TP) slot (or period) of approximately 690 milliseconds (ms). The preamble slot is then followed by a preparatory or ready slot having no tone, and having a duration of approximately 66 milliseconds. The first paging message (for a first paging receiver) begins after the ready slot, and includes five paging tone slots of approximately 33 milliseconds for each of the tones T1, T2, T3, T4 and T5. This first paging message is then followed by an "X-tone" slot which may contain an additional tone known as "X-tone". The presence or absence of the "X-tone" in the "X-tone" slot control the type of paging alarm triggered in response to a paging message. This "X-tone" slot has a duration of approximately 44 milliseconds.

The second paging message (for a second paging receiver) begins after the "X-tone" slot, and also includes five paging tone slots. The second paging message is followed by an inter-message slot, which in turn is followed by the third paging message (for a third paging receiver), and so on for additional paging messages. The number of paging messages that can be used with a single tone preamble slot is only limited by the number of tone slots in the paging message and the number of tones possible in each slot. With five slots and ten tones possible for each slot, there are approximately 100,000 possible message (addresses). Therefore there can be approximately 100,000 paging radio users in the system.

Since the tone preamble slot is intended to provide time to turn on a paging receiver having a battery saving function, it is also preferable that each of the tones in the T1 slot have the same frequency for a particular group of receivers. This provides a more economical use of the battery saving feature. The tones in the various slots may have any desired frequency, depending upon the design preferences. For example, in conventional paging systems there are ten frequencies of 600, 741, 882, 1023, 1164, 1305, 1446, 1587, 1728, and 1869 Hz. possible for each of tones T1–T5. If the tone to be transmitted in two adjacent slots, i.e. T2 and T3 is identical, rather than use the actual tone frequency in the second position a "repeat" tone of 459 Hz. is transmitted. This insures that the paging receiver recognizes that two tones, rather than only one tone, have been transmitted. The conventional frequency for the "X-tone" is 2010 Hz. These frequencies are spread over a reasonable range, so that filtering can be easily accomplished. Additional frequencies may also be utilized to provide a greater number of unique paging messages. For ten different frequencies, a sequence of five paging tones provides 100,000 different combinations thus allowing the use of 100,000 paging receivers.

If a system is utilized which does not have paging receivers with the battery saving function, the tone preamble or TP slot is omitted. In such a system, the receivers are constantly turned on (activated), and the various paging messages are transmitted without a preamble. With respect to the format shown in FIG. 1, each of these paging messages would include paging tones in the slots T1 through T5, followed by an inter-message slot, followed by a subsequent paging message.

Again, it is to be pointed out that the invention can be used with paging messages having other formats and other pluralities of tone slots. This presently preferred, non-limitative, exemplary embodiment is intended for use in systems using five paging tone slots (with or without a tone preamble), since such message formats are used extensively in the paging industry.

Circuit Description

Figure 4:
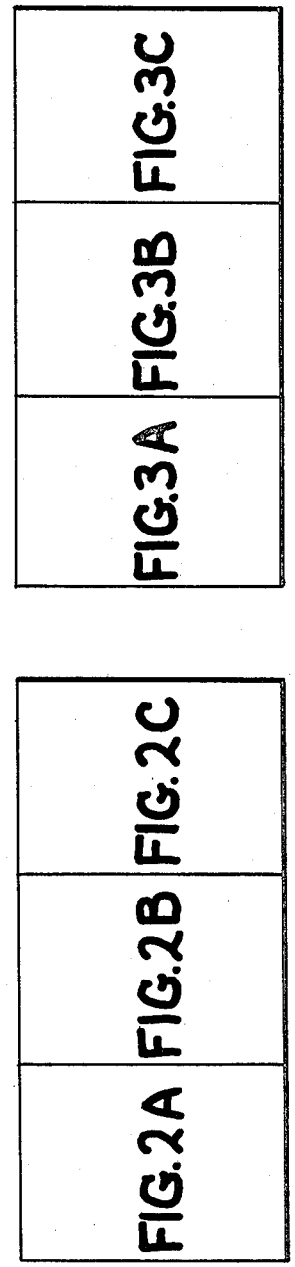
FIG. 4 shows how parts 2A, 2B and 2C of FIG. 2 are arranged and connected together.
Figure 2A:
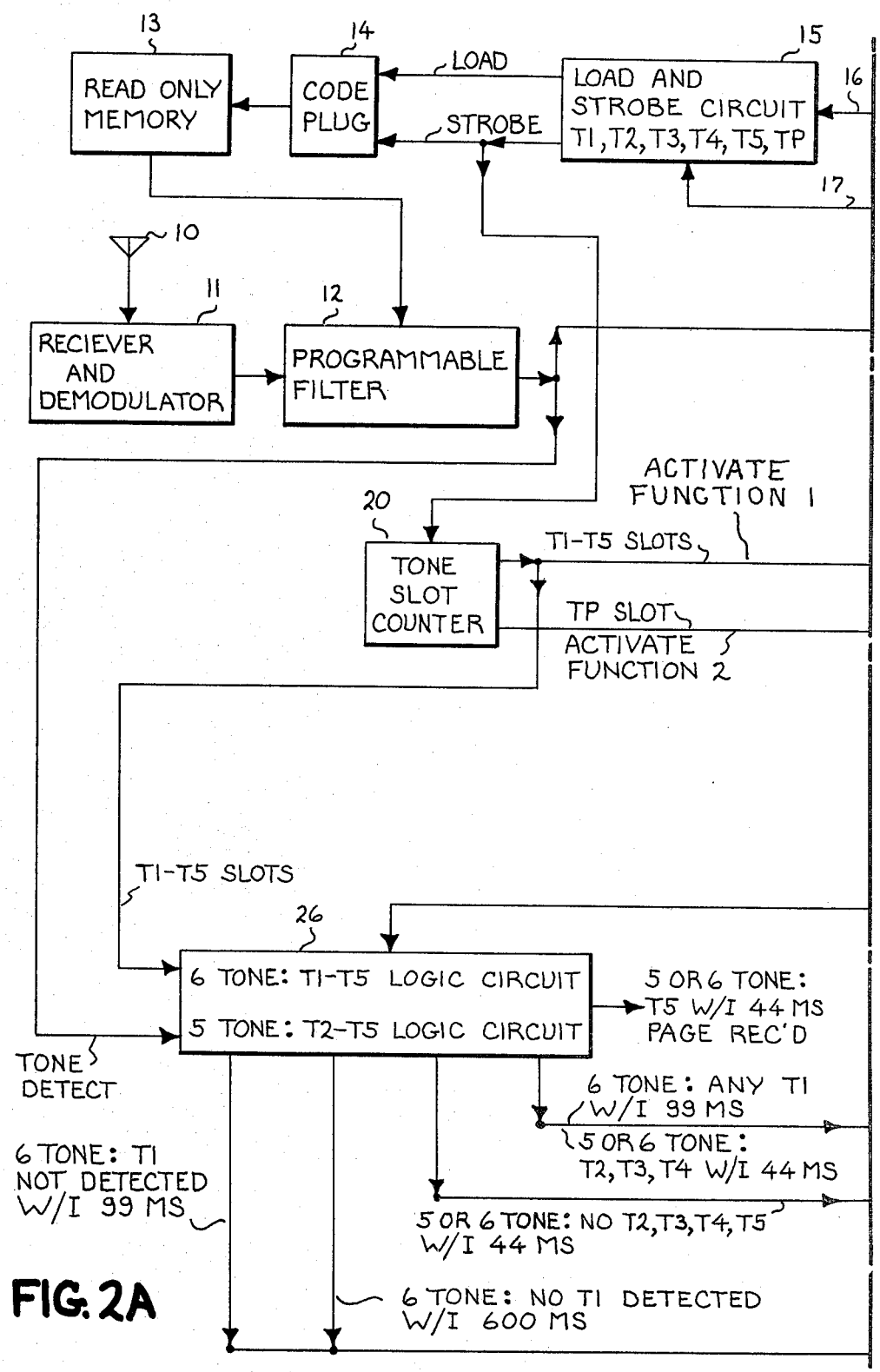
FIG. 2 including parts 2A, 2B and 2C is a functional block diagram of the preferred embodiment of the paging radio receiver in accordance with the present invention.
Figure 2B:
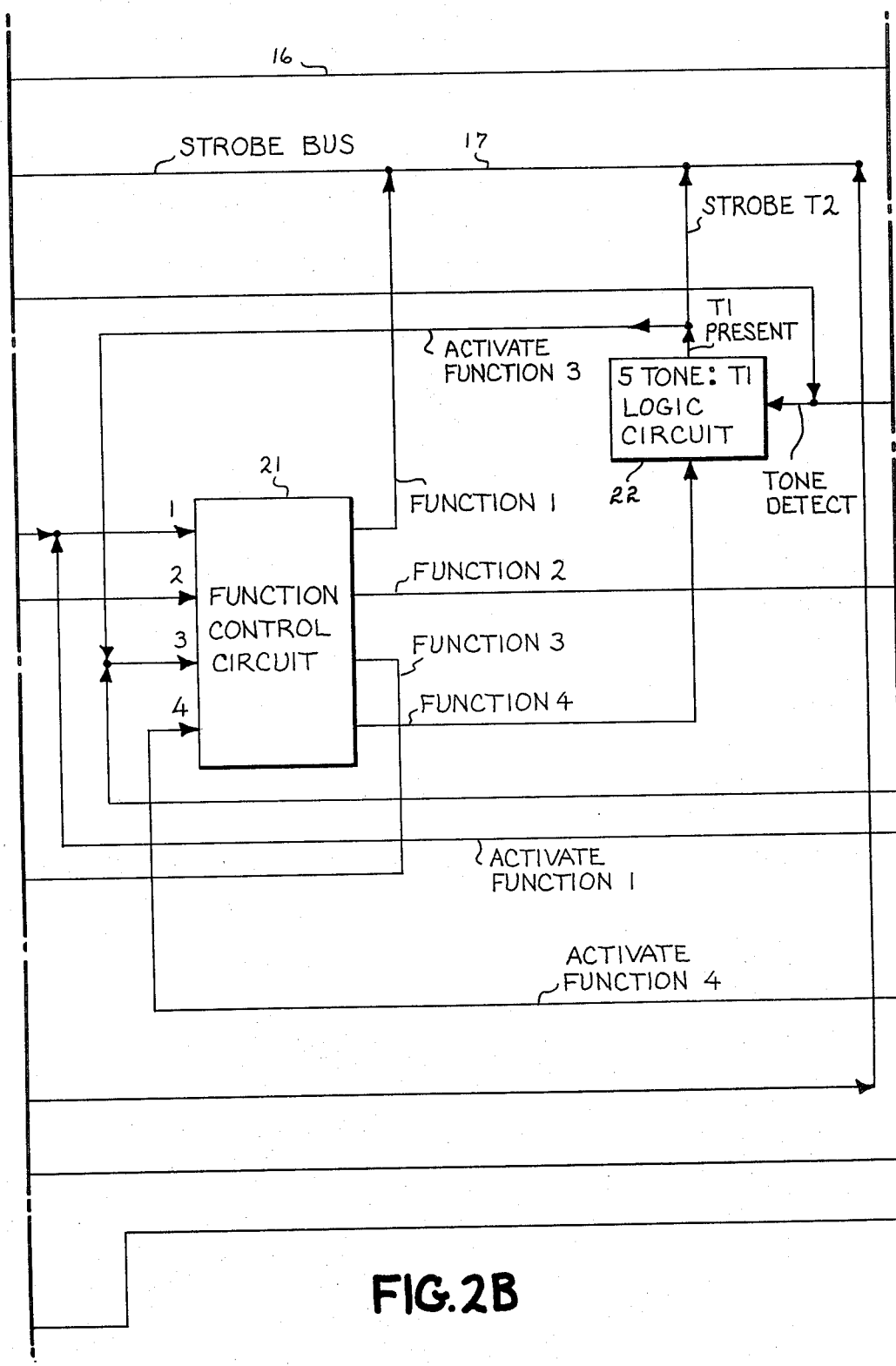
Figure 2C:
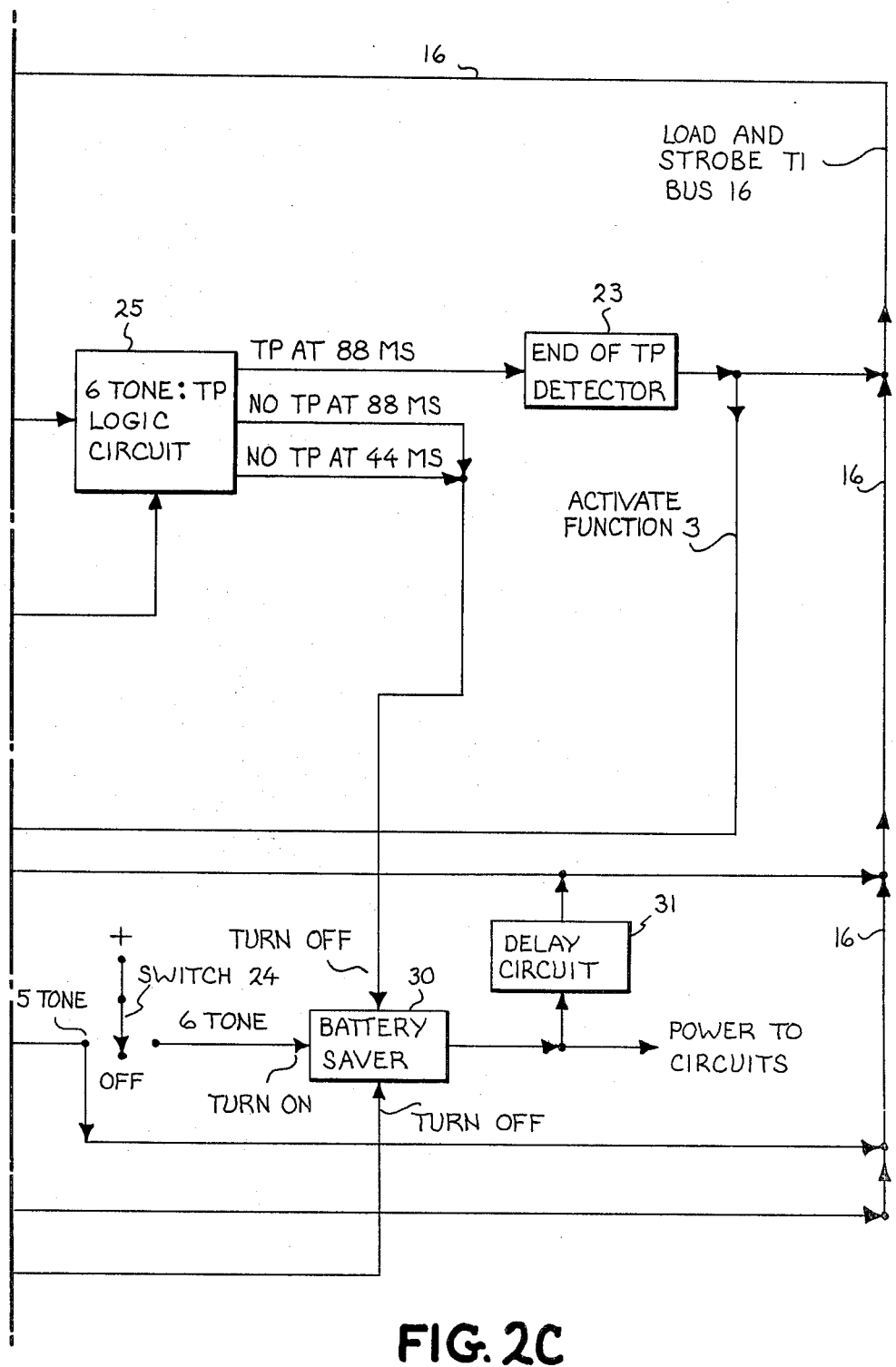

FIG. 2 shows a preferred functional block diagram of paging receiver in accordance with the present invention. Parts 2A, 2B and 2C of FIG. 2 are to be considered together and arranged as illustrated in FIG. 4, with correspondingly positioned lines connected together. The receiver includes a suitable antenna 10 connected to a receiver and demodulator circuit 11. Circuit 11 typically includes a suitable RF amplifier, a mixer, an intermediate frequency amplifier, and a demodulator. Receiver and demodulator circuit 11 is intended to be used to detect sequential audio frequency paging tones superimposed on a radio frequency carrier by any suitable modulation technique, such as amplitude or frequency modulation. The audible tones from the circuit 11 are applied to the input of a digital tone detector 12. At this point, it is to be noted that the circuit of FIG. 2 use binary logic elements. The operation and synchronization of these logic elements are under the control of a clock in accordance with known techniques. The clock and its connections to the various logic elements have been omitted for the sake of clarity. Digital tone detector 12 can be made selectively responsive to any one of a plurality of audible tone frequencies in accordance with binary signals supplied by a read only memory circuit 13. If a tone for which digital tone detector 12 is programmed is received, the detector produces a suitable tone detect output binary signal. Read only memory circuit 13 provides suitable binary signals in response to activation or strobing of a code plug 14. While code plug 14 may take many forms, the preferred embodiment thereof includes a programmed memory, and a plurality of binary shift registers connected to this memory. Code plug 14 is preferably removable so that other code plugs with different memories can be inserted. The programmed memory within code plug 14 includes the binary information for the desired paging tone frequencies and the preamble tone frequency to which the particular receiver is to be responsive. The shift registers are arranged so that they serially produce a binary output starting with the frequency of paging tone 1, followed by the frequencies of paging tones 2, 3, 4, 5 and the preamble tone in that order. A load input is connected to the code plug 14, and when the load input is activated, the information from the code plug memory is shifted into the shift registers. The shift registers are activated in response to strobe or pulse signals to produce a series of output signals that are applied to memory 13. These output signals are binary in form, and when applied to memory 13, cause it to look up information and produce suitable signals that program digital tone detector 12.

A load and strobe circuit 15 is connected to the code plug 14. This circuit 15 includes binary circuits which, in response to a load and strobe T1 signal on a bus 16, causes code plug 14 to load its shift registers (in the order of T1, T2, T3, T4, T5, and TP) and then to strobe or pulse the code plug to produce the sequence of binary signals corresponding to the frequency of tone T1. A strobe bus 17 is also connected to circuit 15 to cause it to produce pulses indicative of the next tone frequency in a sequence. Whenever circuit 15 receives a load and strobe T1 signal, it causes code plug 14 to be reloaded in the order of T1, T2, T3, T4, T5, and TP, and then to be strobed for tone T1. Whenever circuit 15 receives a strobe signal, it causes code plug 14 to be strobed for the next tone in the sequence.

The strobe output from circuit 15 is also applied to a tone slot counter 20. Tone slot counter 20 is arranged to keep track of which particular tone slot is being strobed by circuit 15. Indications of the slots for tones T1 through T5 are applied to input 1 of a function control circuit 21. Indications of the TP slot are applied to input 2 of function control circuit 21. Input 3 of circuit 21 is connected to the output of a five tone T1 logic circuit 22 and to an end of TP detector 23 for detecting the end of the tone preamble. Input 4 is connected to a five tone terminal of a five or six tone selector switch 24. When the function control circuit 21 receives a signal at one of its inputs, it causes the activation of a respective function 1, 2, 3 or 4 at its output. Activated function 1 is applied to the strobe bus 17. Activated function 2 is applied to a six tone TP logic circuit 25. Activated function 3 is applied to a six tone T1 through T5 logic circuit and a five tone T2 through T5 logic circuit 26. Activated function 4 is applied to the five tone T1 logic circuit 22.

When function 1 is activated, each of the T1 through T5 slot indications from slot counter 20 provides a strobe pulse to bus 17. This direct path causes rapid strobing so that programmable filter 12 cannot be set and respond to tones even if they are present.

When function 2 is activated, the six tone TP logic circuit 25 provides indications of the detection (by filter 12) of the tone preamble (TP) at 44 and 88 milliseconds after activation. If no tone preamble (TP) is present at either 44 or 88 milliseconds, an output signal is applied to the turnoff input of a battery saver circuit 30. If a tone preamble TP is detected at 88 milliseconds, an output is applied to the end of tone preamble TP detector 23. When the tone preamble TP terminates, detector 23 applies a signal to the load and strobe T1 bus 16 and activates function 3 in the circuit 21.

When function 3 is activated, logic circuit 26 provides various indications of the detection (by the filter 12) of the tones T1 through T5. In the six tone operation, if the first T1 tone is not detected within 99 milliseconds after the preamble tone ends (this being the 66 milliseconds for the ready slot and 33 milliseconds for the T1 slot), a signal is applied to the turn off input of battery saver 30. However, if any T1 tone is received within 99 milliseconds after the tone preamble ends, a signal is applied to strobe bus 17. Also in six tone operation (six tones including the tone preamble), if no subsequent T1 tone (after at least a first T1 tone has been detected) is detected within a 600 milliseconds period, a turn off signal is applied to battery saver 30. In five or six tone operation, if no T2, T3, T4 or T5 tone is received within 44 milliseconds after its respective slot begins, a signal is applied to load and strobe bus 16. In five or six tone operation, if any T2, T3, or T4 tone is received within 44 milliseconds after its respective slot begins, a signal is applied to strobe bus 17. And finally, if in five or six tone operations, if a T5 tone is received within 44 milliseconds of its appropriate slot, a page receive signal is produced.

When function 4 is activated, the five tone T1 logic circuit 22 produces an output indicative of the presence of a tone T1. The tone detect signal for this circuit 22 is derived from programmable filter 12. This output activates function 3, and is applied to strobe bus 17 to strobe for tone T2.

A switch 24, shown symbolically as a movable arm, supplies suitable power to the circuit and also makes other connections shwn in FIGS. 3A, 3B and 3C. Switch 24 has an off terminal, a five tone terminal, and a six tone terminal. When switch 24 engages the five tone terminal, it activates function 4 in the circuit 21, and applies a signal to load and strobe bus 16 to initiate five tone paging reception. When switch 24 is in the six tone position, it energizes or turns on the battery saver circuit 30.

A battery saver circuit 10 is arranged so that after it is initially started, it holds power off for 515±15 milliseconds. After that 515±15 milliseconds, it turns power on. The power remains on until a turnoff signal is applied to battery saver circuit 30. Subsequently, after power is turned off, power will be turned on again after approximately 515±15 milliseconds. Battery saver circuit 30 supplies power to energize the radio receiver circuits. After a delay of about 13±2 milliseconds provided by the delay circuit 31 to permit the receiver to stabilize, battery saver circuit 30 produces an output signal that activates function 1 and applies a signal to load and strobe tone T1 bus 16.

Circuit Operation

Figure 5:
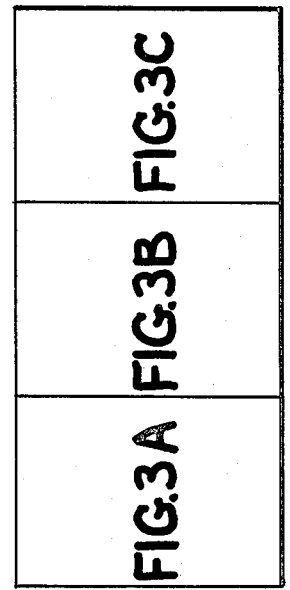
FIG. 5 shows how parts 3A, 3B and 3C of FIG. 3 are arranged and connected together.

The operation of the circuit of FIG. 2 will be explained in connection with the aid of a functional flow chart shown in FIGS. 3 including parts 3A, 3B and 3C. Parts 3A, 3B and 3C are to be considered together and arranged as shown in FIG. 5, with correspondingly positioned lines connected together. The operation will also be described based upon use of the tone format shown in FIG. 1. First, the operation will be described for the battery saving circuit with a six tone format, namely a tone preamble and five paging tones. Then the operation will be described for no battery saving with the five tone format.

Six Tone

For the six tone format, switch 24 shown in FIG. 3 is moved to its six tone position. This activates battery saver 30 which turns the radio receiver off, and then turns the receiver on 515±15 milliseconds later. Subsequently, the receiver is turned on 500 milliseconds after each turnoff. This insures that the receiver will be turned on and receptive during the 690 milliseconds time period of the tone preamble. When battery saver 30 turns the receiver on, the output from delay circuit 31 activates function 1 in the control circuit 21, and loads code plug 14. It also then provides the strobing signal for tone T1. The T1 strobing signal causes slot counter 20 to produce a T1 slot signal. This T1 slot signal is passed by circuit 21 to strobe bus 17 to strobe the T2 slot signal. This process continues through slots for T3, T4 and T5. When the T5 slot signal is produced, the TP signal is strobed. This sequence is shown in function block 40, and takes place very rapidly, since the slot signals are passed directly to strobe bus 17. During this sequence, function control circuit 21 looks for the presence of the tone preamble TP slot. This is indicated by the logic decision block 41 which asks if the tone slot counter 20 is in the TP slot. As long as the answer to this question is no, tone slot counter 20 produces a tone slot indication signal which causes circuit 21 to supply to its function 1 output to strobe the additional tones. However, when the answer is yes, indicating that the TP slot is present, logic decision block 41 activates function 2 shown by function block 42. As shown in FIG. 2, this activates logic circuit 25 which, according to a logic decision block 43 asks whether the tone preamble TP is detected at 44 milliseconds (i.e., 44 milliseconds after the TP slot begins). If the tone preamble is not detected at 44 milliseconds (i.e., the answer is no), battery saver 30 is turned off, and remains off until reactivation 515±15 milliseconds later. However, if the tone preamble TP is detected at 44 milliseconds (i.e., the answer is yes), then a logic decision block 44 asks whether the tone preamble is detected at 88 milliseconds (i.e., 88 milliseconds after the TP slot begins). If the tone preamble is not detected at 88 milliseconds, battery saver 30 is turned off, and remains off for 515±15 milliseconds. However, if the tone preamble TP is detected at 88 milliseconds, then the tone preamble end is looked for as indicated by a logic decision block 45.

When the tone preamble TP ends, it activates function 3, loads the code plug, and strobes the tone frequency T1 as indicated by the function block 46. When function 3 is activated, circuit 21 activates the logic circuit 26. The logic decision block 47 determines whether the first paging tone T1 is detected within 99 milliseconds. With respect to FIG. 1, the ready slot of 66 milliseconds is provided after the tone preamble slot ends. These 66 milliseconds plus the tone T1 slot of 33 milliseconds total 99 milliseconds. If the first T1 tone is not detected within these 99 milliseconds, battery saver 30 turns power off for 500 milliseconds. However, if the first T1 tone is detected within 99 milliseconds, the output of circuit 16 is applied to strobe bus 17 to strobe tone T2. This is indicated by a function block 48. Logic circuit 26 then determines whether the tone T2 is detected within 44 milliseconds. This is indicated by a logic decision block 49. If the tone T2 is not detected within 44 milliseconds, logic circuit 26 loads code plug 14 and strobes tone T1, as indicated by a function block 52. If the tone T2 is detected within 44 milliseconds, logic circuit 26 strobes tone T3 indicated by a function block 50.

After tone T3 is strobed by circuit 26 as indicated by function block 50, the logic decision block 51 determines whether tone T3 is detected within 44 milliseconds. If tone T3 is not detected within 44 milliseconds, the logic circuit 26 loads code plug 14 and strobes tone T1, as indicated by function block 52. However, if tone T3 is detected within 44 milliseconds, tone T4 is strobed by circuit 26 as indicated by a function block 53. After tone T4 is strobed, a logic decision block 54 determines whether tone T4 is detected within 44 milliseconds. If tone T4 is not detected within 44 milliseconds, code plug 14 is loaded and tone T1 strobed again as indicated by function block 52. However, if tone T4 is detected within 44 milliseconds by decision block 54, tone T5 is strobed by the circuit 26 as indicated by a function block 55. After tone T5 is strobed, logic decision block 56 determines whether tone T5 is detected within 44 milliseconds. If tone T5 is not detected within 44 milliseconds, code plug 14 is loaded and tone T1 is strobed again, as indicated by function block 52. If tone T5 is detected within 44 milliseconds, then the "X-tone" (TX) is strobed by function block 190. The presence or absence of the "X-tone" select causes decision block 191 to which of two different alarms will be triggered as the page.

If function block 52 causes code plug 14 to be loaded and tone T1 strobed, this causes all T1 tones, particularly those after the first T1 tone, to be looked for within 600 milliseconds as indicated by a logic decision block 57. If any T1 tone is not detected within 600 milliseconds, battery saver 30 turns power off. This provides an appropriate response for the condition where, after the tone preamble and the first T1 tone, no T1 tone is received within 600 milliseconds, which is more than the time of one paging message. This condition would indicate the end of that preamble tone group transmission, or faulty transmission or bad signal conditions, and under such conditions it is desirable that the battery saver turn power off for 515±15 milliseconds. However, if the subsequent T1 tones are detected within 600 milliseconds, logic decision block 57 causes a strobing of tone T2.

Five Tone

For five tone operation, switch 24 is moved to the five tone contacts. When this occurs, function 4 in control circuit 21 is activated, code plug 14 is loaded, and tone T1 strobed, as indicated by a function block 60. When function 4 is activated, logic circuit 22 looks for tone T1, as indicated by a logic decision block 61. As long as tone T1 is not detected, no further action occurs. However, when tone T1 is detected, function 3 of the control circuit 21 is activated as indicated by a function block 62. This activates logic circuit 26 and strobes tone T2 as indicated by the function block 48. This circuit then utilizes the remainder of the six tone function and logic decision blocks 49–56 previously described, except for blocks 52, 57. In six tone operation, code plug 14 is loaded and tone T1 strobed as indicated by blocks 52, 57 if any of tone T2, T3, T4 or T5 are not detected within their respective 44 millisecond period. In five tone operation, switch 24 causes nondetection of tones T2, T3, T4 or T5 by logic decision blocks 49, 51, 54, 56 to activate function block 60 and function block 60 to function 4 again. Thus, for the five tone operation, the function 4 is activated, and remains activated until tone T1 is detected. When tone T1 is detected, function 3 is activated to strobe for tone T2, and subsequent tones T3, T4 and T5 if their preceding tones are detected.

Brief Summary of Operation

Following a brief summary of the operation of the paging receiver, according to the present invention as shown in the functional block diagram of FIG. 2 and the functional flow chart of FIG. 3.

After the paging receiver has been turned on for six tone reception, battery saver 30 applies power to the receiver circuits every 515±15 milliseconds. When power is applied, this activates Function 1; loads code plug 14 in the normal order of tone 1, tone 2, tone 3, tone 4, tone 5, and preamble tone; and strobes tone 1.

Six Tone

I. Function 1: Tone slots 1 through 5.
  A. The output of tone slot counter 20 is applied to the strobe bus to provide rapid strobing of tones 1 through 5, and then the tone preamble. When the tone preamble is strobed, Function 2 is activated.
II. Function 2: Tone Preamble Slot.
  A. If the correct tone preamble is not detected within a first 44 milliseconds timing period, battery saver 30 turns the receiver off to await the next battery saver cycle 515±15 milliseconds later, and a repeat of Function 1.
  B. If the correct tone preamble is detected at the end of the first 44 milliseconds timing period, a second 44 milliseconds timing period is started.
    1. If the correct tone preamble is not still detected at the end of the second 44 milliseconds timing period, the battery saver turns the receiver off to await the next battery saving cycle, and a repeat of Function 1.
    2. If the correct tone preamble is still detected at the end of the second 44 milliseconds timing period, the end of the tone preamble is awaited.
    3. After the tone preamble ends, Function 3 is activated, code plug 14 is loaded in its normal order beginning with tone 1, and tone 1 is strobed.
III. Function 3: Tone Slots 1 through 5.
  A. If the correct tone 1 is not detected within 99 milliseconds after tone 1 is strobed, battery saver 30 is turned off to await the next battery saving cycle, and a repeat of Function 1.
  B. If the correct second T1 and subsequent tones 1 are not detected within 600 milliseconds under any condition after tone 1 is strobed, the battery saver turns power off to await the next battery saving cycle, and a repeat of Function 1.
  C. If the correct tone 1 is detected within 99 milliseconds after tone 1 is strobed, tone 2 is strobed.
  D. If any one of the correct tones 2 through 5 is not detected in its respective slot within 44 milliseconds after strobing, code plug 14 is loaded again in its normal order beginning with tone 1, and tone 1 is strobed.
  E. If each of the correct tones 2 through 5 is detected in its respective slot within 44 milliseconds after strobing, the next tone is strobed. If the correct tone 5 is detected in slot 5, a paging signal is given after it is determined whether or not the "X-tone" is present.

Five Tone

After the paging receiver has been turned on for five tone operation, this activates Function 4; loads code plug 14 in the normal order of tone 1, tone 2, tone 3, tone 4, tone 5, and preamble tone; and strobes tone 1.
IV. Function 4: Tone Slot 1.
  A. If the correct tone 1 is detected in tone slot 1, function 3 is activated, and tone 2 is strobed.
  B. If the correct tone 1 is not detected, function 4 continues until tone 1 is detected.
V. Function 3: Tone Slots 2 through 5.
  A. If any one of the correct tones 2 through 5 is not detected in its respective slot within 44 milliseconds after strobing, function 4 is activated, the code plug is loaded again in its normal order beginning with tone 1, and tone 1 is strobed.
  B. If each of the correct tones 2 through 5 is detected in its respective slot within 44 milliseconds after strobing, the next tone is strobed. If the correct tone 5 is detected in slot 5, a paging signal is given after the presence or absence of the "X-tone" is determined.

Integrated Circuit Chip Implementation

Figure 6:
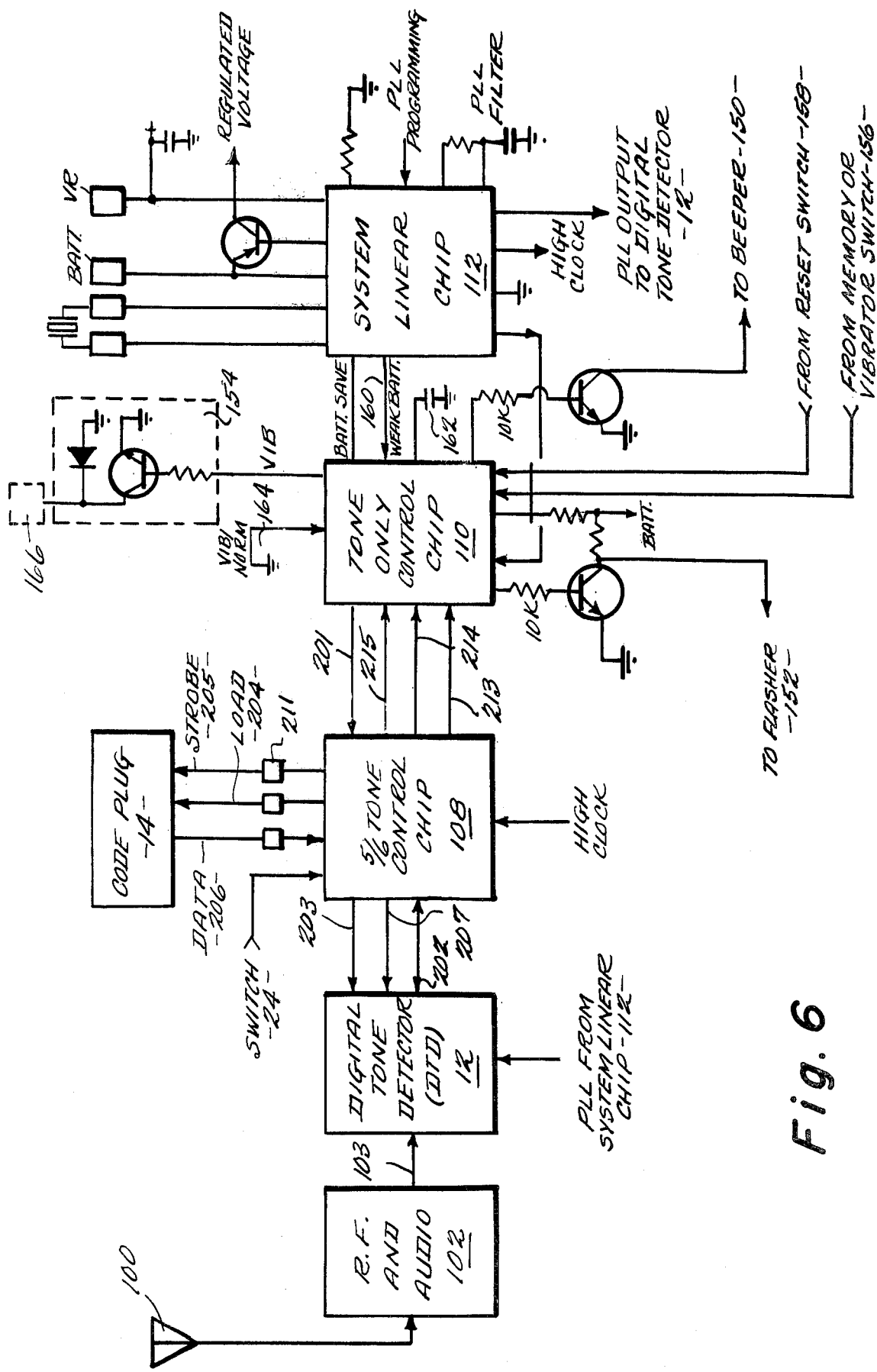
FIG. 6 is a hardware block diagram of the paging receiver according to the present invention.

Referring now to FIG. 6, there is shown a block diagram of the presently preferred embodiment of the paging receiver according to the present invention. The paging receiver was functionally described in great detail with respect to the functional block diagram shown in FIG. 2 and the accompanying flow chart shown in FIG. 3. The presently preferred embodiment is an integrated circuit chip implementation of the functions already described in, in essence, a state machine utilizing custom integrated circuits. Of course, other implementations are possible without deviating from the scope of the invention as defined by the claims. The specific implementation as set forth below is only a presently preferred non-limitative example, set forth for the sake of completeness.

RF signals from a central paging transmitter are received via an antenna 100. The received signals are detected and demodulated by an RF and audio section 102 to provide a detected audio signal on a signal line 103. The detected audio signal is coupled to a signal input of digital tone detector 12 (also shown in FIG. 2). The particular tone sequence identifying the paging receiver is stored in code plug 14. Code plug 14 is coupled to 5/6 tone control chip 108 via data line 206, strobe line 205 and load line 204. These three lines couple code plug 14 to 5/6 tone control chip via terminals 211 permitting the code plug to be easily detached.

A 5/6 tone control chip 108 provides timing control, digital tone detector 12 control, and code plug 14 control. A tone only control chip 110 provides additional timers, format logic, drivers, beeper format for the page, vibrator logic and driver circuitry for an optional vibrator motor that can be used as the page annunciator switch interfaces, power on clear circuitry, battery saving logic and timer control, and power control logic. A system linear chip 112 provides for various linear pager functions. System linear chip 112 includes a voltage regulator, a weak battery sensor, and 32 kHz oscillator for providing clock pulses, and phase locked loop (PLL) for deriving the high frequency clock signals required by digital tone detector 12. Each of the chips is a custom integrated circuit utilizing I²L circuitry.

Figure 7:
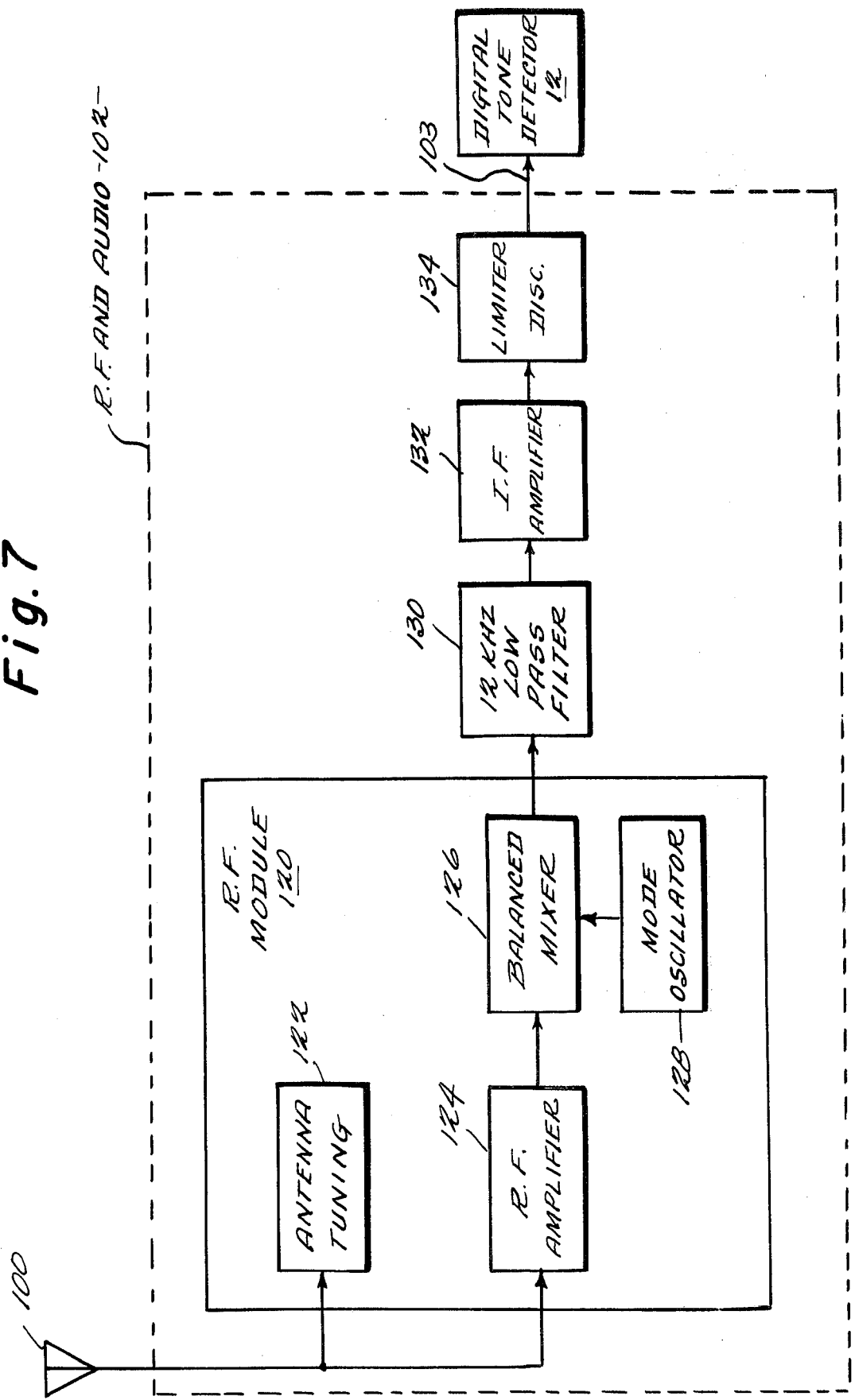
FIG. 7 is a more detailed block diagram of the RF and audio circuit block shown in FIG. 6.

Referring now to FIG. 7, there is shown a more detailed block diagram of RF and audio circuit 102. Antenna signals are coupled to an RF module 120. Specifically, antenna signals are coupled to an antenna tuning circuit 122 and to an RF amplifier 124 within RF module 120. The output of RF amplifier 124 is coupled to a balanced mixture 126 wherein signals from the RF amplifier are mixed with signals generated by a mode oscillator 128. The output of balance mixture 126 is coupled to a 12 kHz low pass filter 130. The output of low pass filter 130 is coupled to an IF amplifier 132, the output of which is coupled to the input of a limiter discriminator 134. The limited output of limiter discriminator 134 is coupled via signal line 103 to the signal input of programmable filter 12.

Figure 8:
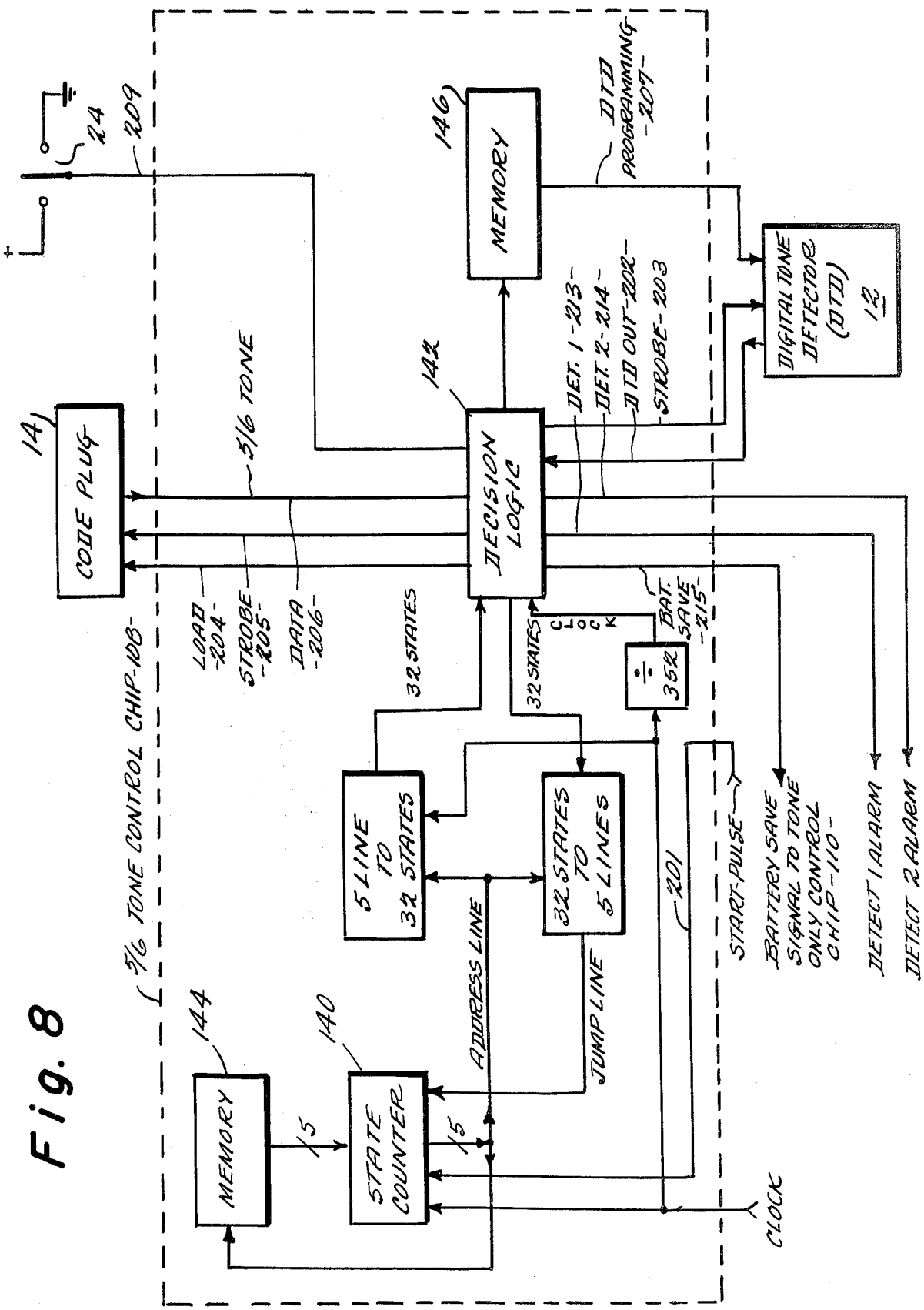
FIG. 8 is a more detailed block diagram of the 5/6 tone control chip shown in FIG. 6.

Referring now to FIG. 8, there is shown a more detailed block diagram of 5/6 tone control chip 108. As can be seen by reference to the figure, 5/6 tone control chip 108 interfaces with digital tone detector 12, code plug 14, and switch 24. 5/6 tone control chip 108 strobes 12 via a strobe line 203, receives detect signals from the programmable filter via a line 202 and provides programming signals to the filter via a line 207. Five/six tone control chip strobes code plug 14 via a strobe line 205, coupled to the code plug via load line 204 and receives data therefrom via data line 206. Code plug 14 is detachably coupled through terminals 211 and signal lines 204, 205, and 206 so that it can be changed as needed (see FIG. 6). 5/6 tone control chip receives a switch signal from switch 24 via line 209 to select five or six tone format operation. 5/6 tone control chip 108 is an I²L circuit which has its injector current turned off during the 515 ms battery saving interval. After the 515±15 ms battery saving interval, the injector current is turned on. Approximately 13±2 ms later, a start pulse is generated on a signal line 201 by tone only control chip 110 (see FIG. 6). The 13±2 ms delay allows all pager receiver circuits to stablize after power is applied.

5/6 tone control chip 108 is, in essence, a state machine and includes a state counter 140. After the 13±2 ms delay, described above, state counter 140 begins to advance from state 0 toward state 32. After each step, a decision logic circuit 142 evaluates system progress and determines whether state counter 140 should advance sequentially or jump to a non-sequential state. When a jump decision has been made, the new state address is obtained from a memory 144. Decision logic 142 obtains an individual paging code from code plug 14 and utilizes the information to address a memory 146 associated specifically with the decision logic. Memory 146 is intended specifically for the programming of digital tone detector 12. The format of information provided by code plug 14 is, in the preferred embodiment, tone T1 through tone T5, followed by the preamble with tone X information being provided by the 5/6 tone control chip. Decision logic 142 then waits for a fixed interval of time for detect to occur, i.e., a tone occurring during its appropriate time interval or window. If a detect occurs, the system reprograms for the next paging message bit. However, if a detect does not occur, the system either starts over or enters its battery saving mode by providing a signal on a battery save line 215 coupled to tone only control 110. When paging message bits have been received, i.e., the sequence of tones and preamble define by the code plug has been received, decision logic 142 determines which message alarm to sound and places an appropriate signal on a detect line 213 or a detect line 214. A state diagram for the 5/6 tone control chip is included as FIG. 9 wherein state numbers are shown encircled.

For five (5) tone operation, the system loads tone T1 address information (a four bit word) from code plug 14 and, in turn, produces a 15 bit code which programs digital tone detector 12 for the detection of tone 1. The system then waits until a tone T1 detect has been achieved. Upon receipt of tone T1, the system reprograms for tone 2. Upon reprogramming to tone 2, the system will wait up to 44 ms for a detect to occur. If a correct page, i.e., the tone sequence designated by code plug 14, is being received, this process is repeated through tone T5. After tone T5 has been detected, the system has a successful message detect and it reprograms for the tone X called for by the 5/6 tone control chip 108 and waits up to 44 ms. Based upon either a detect or failure to detect, decision logic 142 determines which alarm to sound and places the appropriate signal on line 213 or 214. If there is no successful detection at any point from tone T2 through tone T5, the system reprograms and starts the process over at tone T1.

For six (6) tone operation, the system cycles code plug 14 through tones T1-T5, stopping at the last address position of the preamble. The system waits 44 ms, samples the output of programmable filter 12 and either repeats the 44 msec wait one more time for a proper detection or returns to the battery saving mode by signalling on line 215 should either of the two samples be incorrect. After a successful preamble detection, the system waits for the preamble to be completed and then reprograms for tone T1. Due to the intercall space in the paging message, the system will allow to 99 ms for a tone T1 detection. If there is no tone T1 detection during that 99 ms, the system returns to a battery saving mode. When tone 1 is detected, the system reprograms for tone 2 and allows up to 44 ms for a detection to occur. If a correct message is being received, i.e., the tone sequence specified by code plug 14, this process is repeated through tone T5. However, if a detect does not occur during the appropriate intervals for the detection of tones T2 through tone T5, the system reprograms for tone 1 but now allows up to 600 ms for a detection to occur. When the system has successfully detected through tone T5, a correct message has been received. The system programs for tone X and wait up to 44 ms. Based upon either a detection or lack of detection, it decides which alarm to sound and places the appropriate signal on line 213 or 214.

Figure 9:
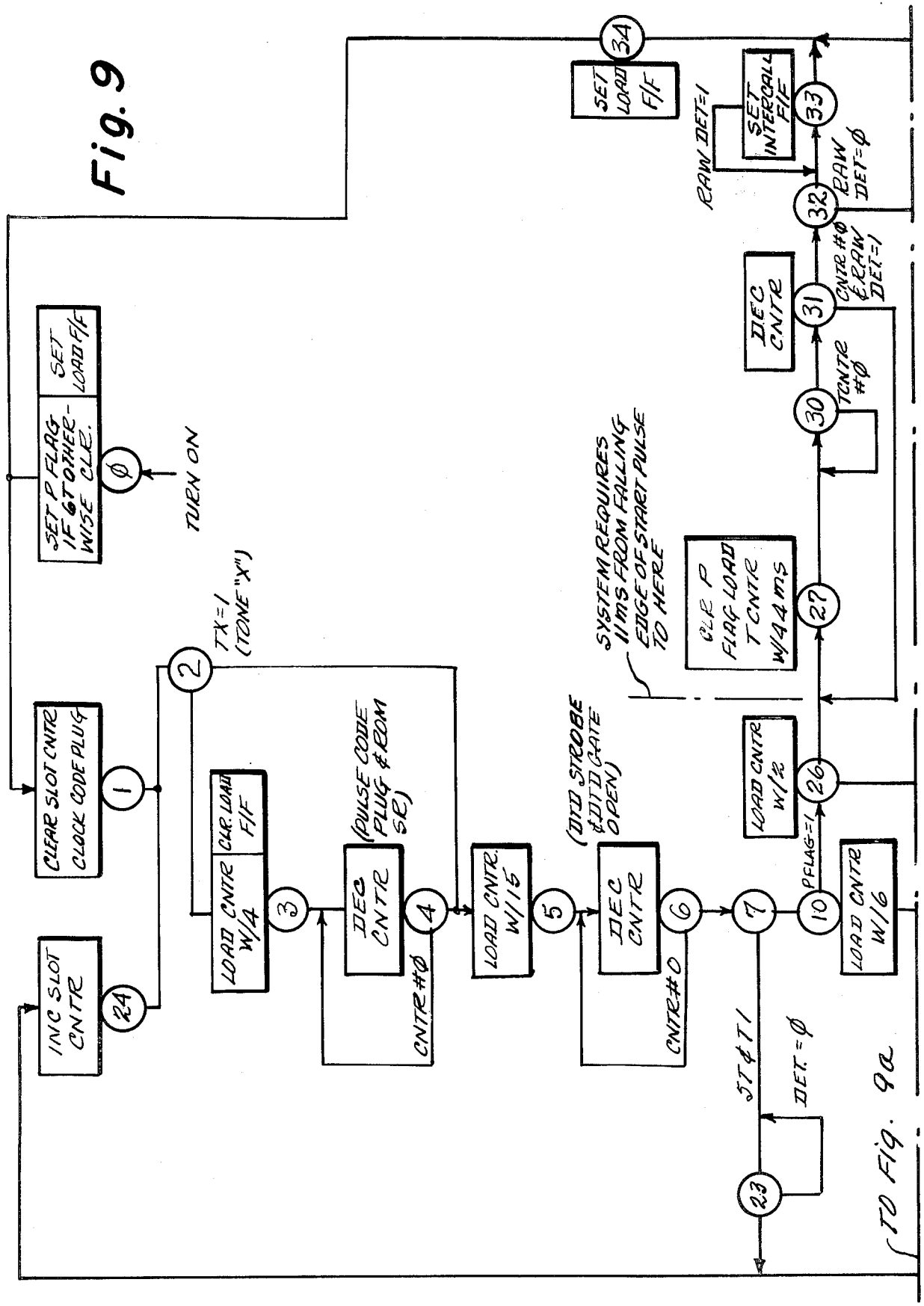
FIG. 9 is a state diagram describing the function of the 5/6 tone control chip shown in FIGS. 6 and 8.

Referring now to FIG. 9, the detailed flow of states of 5/6 tone control chip 108 is set forth. Upon turn on of the pager, at state 0, a "P" flag is set if the paging receiver is operating in the six tone mode. Otherwise, the "P" flag is cleared. In addition, a load flip-flop is set and an appropriate signal is placed on load signal line 204 to code plug 14. At state 1, a slot counter is cleared and code plug 14 is clocked. The fast cycle programming during which digital tone detector 12 is programmed to respond to tones t1-t5 and the preamble sufficiently rapidly that a detect is not possible is controlled by a loop including states 2-7, 10, 26, and 24. It should be noted that there is a jump from state 26 back to state 24 whenever the tone preamble is not detected.

When the tone preamble slot is detected at state 26, there is a normal progression to state 27. At state 26, a counter is loaded to decrement from 2. this causes up to two looks at the preamble each delayed by 44 ms (states 27, 30, 31). Once both preamble detects have occurred the state machine moves to state 33 and waits for the end of preamble. At state 32, if there has been a figure to detect the preamble, there is a jump to state 22 to invoke the battery saver feature. The 44 millisecond time period shown at functional blocks 43 and 44 of FIG. 3 are controlled by the timer set at state 27.

Upon preamble termination the states progress from 3-34 and back to 1 so that each tone may be set up for detection by digital tone detector 12. In state 12 the system will look for the first tone 1 for up to 99 ms as set up by state 11 when the system is in slot T1. Should slot T1 not be found the state machine goes to battery saving through states 13,14,15 and 22. If T1 were found the system sets up for T2 via states 13,24, 2-7, 10, 11 and 12. In state 11 the timer is set to 44 ms. since the system is not in slot T1. If T2 is not found the state machine sets up (via states 13, 14, 15, 16, 34, 1–7, 10, 11 and 12) to look for T1 a second time. The state machine now allows 600 ms to fine T1 before it goes to battery saving. The 600 millisecond time period shown in functional block 57 of FIG. 3B is established by six separate 100 millisecond trips around the loop including states 11–17 and 20. Tone x detection for determining which of two possible page alarms is sounded is determined by the loop including states 14 and 25.

While 5/6 tone control chip 108 carries out the functions that are directly related to tone format, tone only control chip 110 carries out all functions not directly related to pager tone format. Referring again to FIG. 6, tone only control chip 110 accepts detect signals on lines 213 and 214 and controls a beeper 150, flasher 152, and vibrator 154. Tone only control chip 110 interfaces with a memory switch 156 and a reset switch 158. Tone only control chip 10 also controls the battery saving cycle if it is used. Therefore, the tone only control chip 110 must itself be powered up whenever the paging receiver is on. A signal on a weak battery signal line 160 from system linear chip 112 is also used to control the output of tone only control chip 110 to beeper 150. An external capacitor 162 provides a power-on-clear signal upon turn on of the paging receiver.

When the paging receiver is switched on, beeper 150 produces a slow intermittent beep of an approximately 2 kHz tone to indicate a good battery. If the battery is bad, a fast intermittent beep is heard instead of the slow intermittent beep. The same slow intermittent beep sounds thereafter to indicate a primary call. A continuous beep indicates secondary calls. If both calls are received while in a memory mode, a distinctive beep is heard when the memory is clear. All beeps last approximately 8 seconds unless previously reset by a depressing of reset switch 158. Due to battery sag, a weak battery is not checked until 14 seconds after any beep.

The paging receiver may be placed into a memory mode by depressing memory switch 156. Memory switch 156, like other switches used in the paging receiver, is a touch switch. A slowly flashing light emitting diode (LED) utilizes as flasher 152 is activated while in the memory mode. If a call is received while the paging receiver is operating in memory mode, the LED flashes noticeably faster. Flasher 152 makes no distinction between call 1 or call 2. The memory mode is cleared by touching the memory switch 156 again which disables the flasher 152 and activates the appropriate beep if any calls have been stored while the receiver was operating in memory mode.

The pager is operated on approximately a 10 percent duty cycle in 6 tone operation. This corresponds to approximately 68 ms on and 515±15 ms off. At the beginning of a cycle, i.e., at turn on, a voltage regulator within system linear chip 112 is enabled thereby applying power to the RF and audio section 102 and other decoder circuits. After a 13 ms delay to allow the receiver to come up to full power, a start signal is generated and sent to the format decoder. The format decoder circuit examines the received signal long enough to determine whether a correct code is being sent. If a good code is received, a detect signal is sent to tone only control chip 110 and the tone only control chip takes over paging receiver operation. If a correct signal has not been received, a command to turn on battery saving mode (turn off power) is returned to the tone only control chip 110 and power is turned off for 515±15 ms.

The paging receiver is also capable of operating in a vibrator mode. A vibrator can be used to replace the memory function. A VIB/NORM (vibrator/normal) strap is opened to allow tone only control chip 110 to function in the vibrator mode. When the paging receiver is turned on, it operates as a beeper as described above. Pressing a vibrator switch 156 puts the unit in a vibrator mode and causes flasher 152 to flash slowly. The paging receiver can include optionally a memory or vibrator. If the vibrator option is selected, pressing memory switch 156 will cause a page alarm to activate the vibrator to alert or page the user. If the "memory" option is selected, pressing memory switch 156 causes a page alarm to be stored until the user desired to receive a page. Incoming calls immediately activate the vibrator, intermittent for call 1, continuously for call 2, and high speed flasher.

Figure 10:
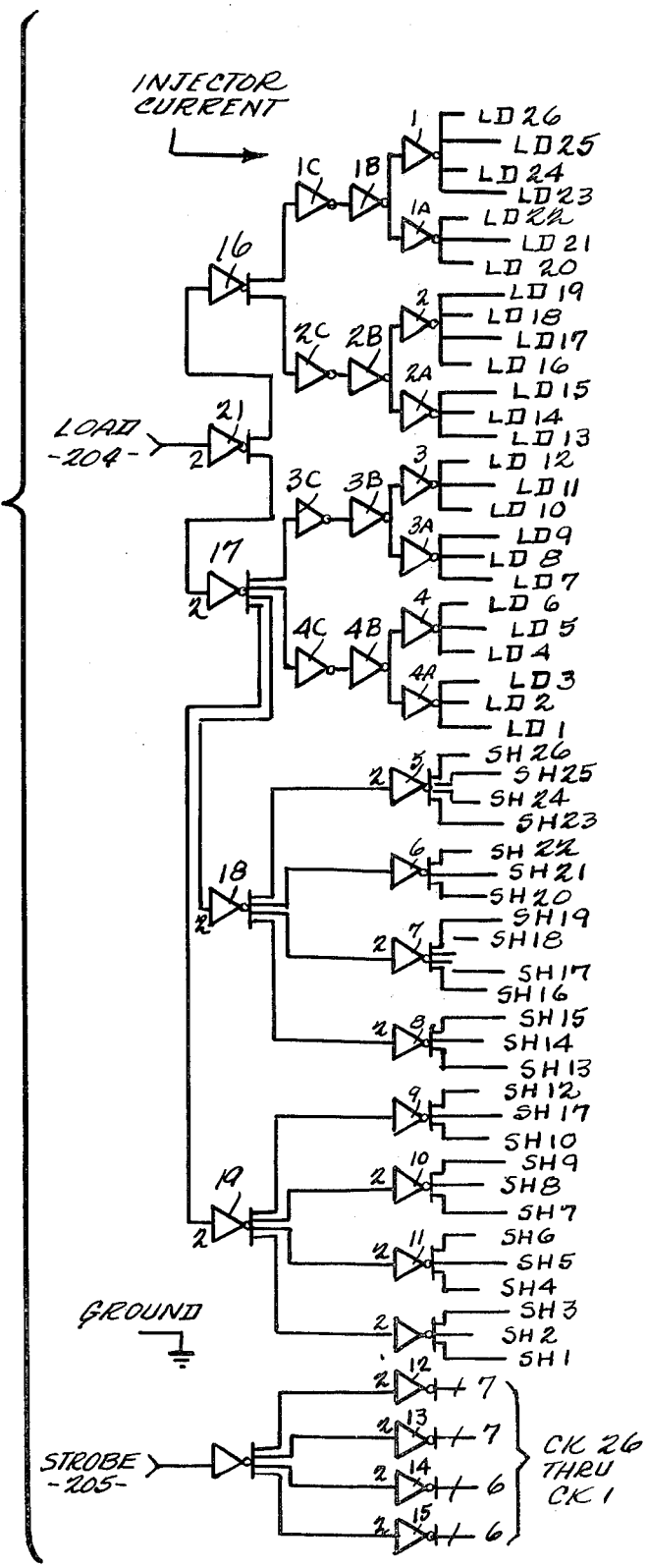
FIG. 10 is a detailed schematic diagram of the code plug shown in FIGS. 6 and 8.
Figure 11:
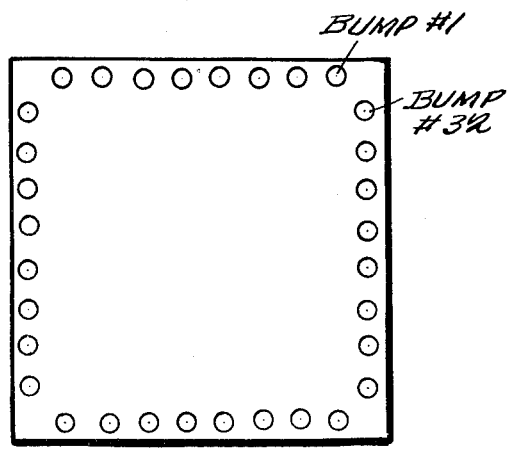
FIG. 11 is a "bump" diagram of the code plug chip.
Figure 10A:
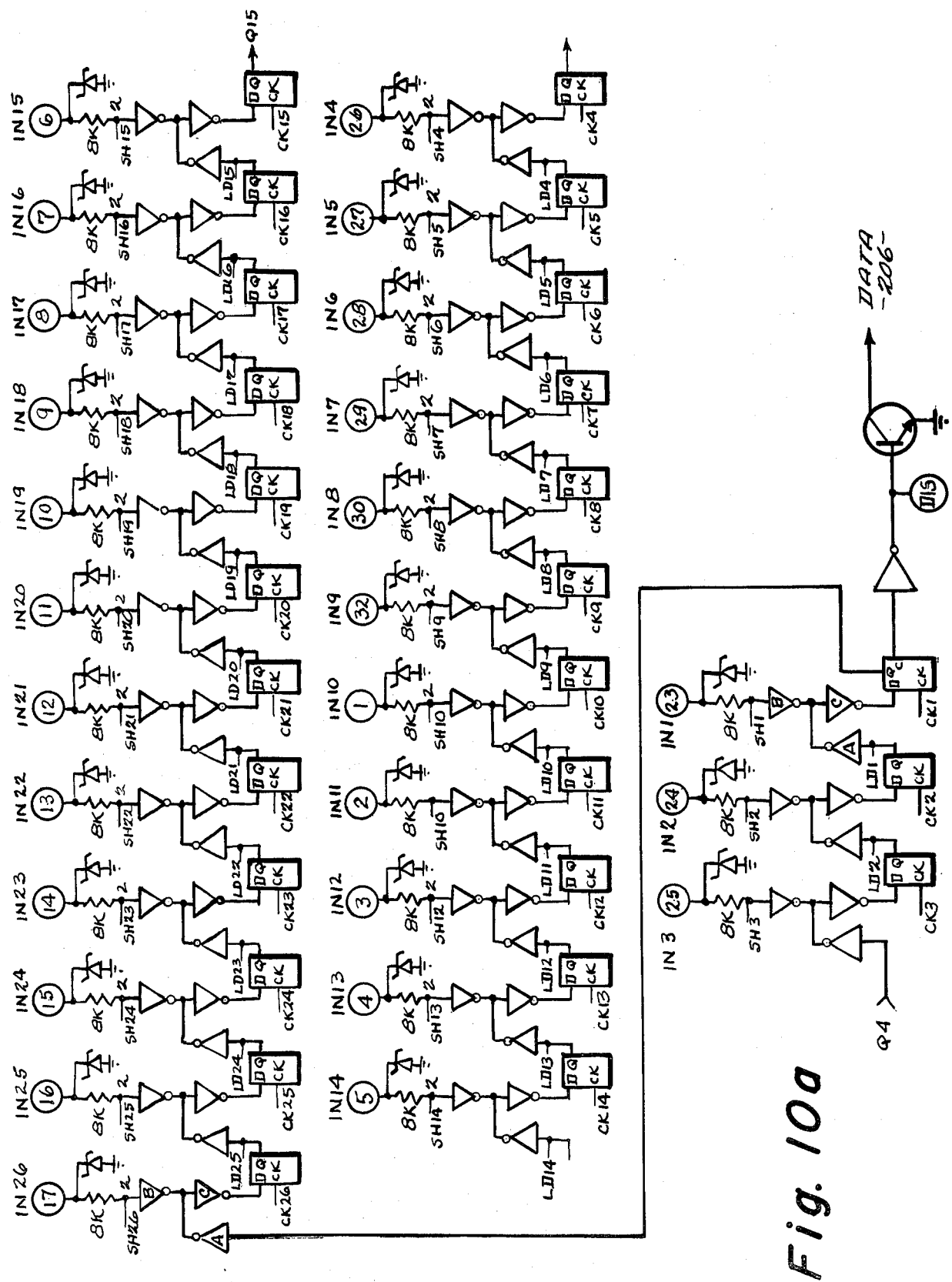

Referring now to FIG. 10, there is shown a detailed schematic diagram of code plug 14. A specific address for the code plug is "programmed" by application of signals to programming inputs 1N1 . . . 1N26, each circled. These signals burn out selected diodes, each at the input of a flip-flop circuit. For a load operation (load input to 204) each of the LD inputs to the flip-flop circuits are "0" and each of the SH inputs to the flip-flop circuits is a "1". The programming information is then loaded into the flip-flops by applying one strobe and then removing the load request. In a strobe operation, the SH inputs to each of the flip-flop circuits is "0" and the LD inputs are "1". The programming from bottom of attached Pg. 29. A layout "bump" diagram of the code plug is shown in FIG. 11.

Figure 12:
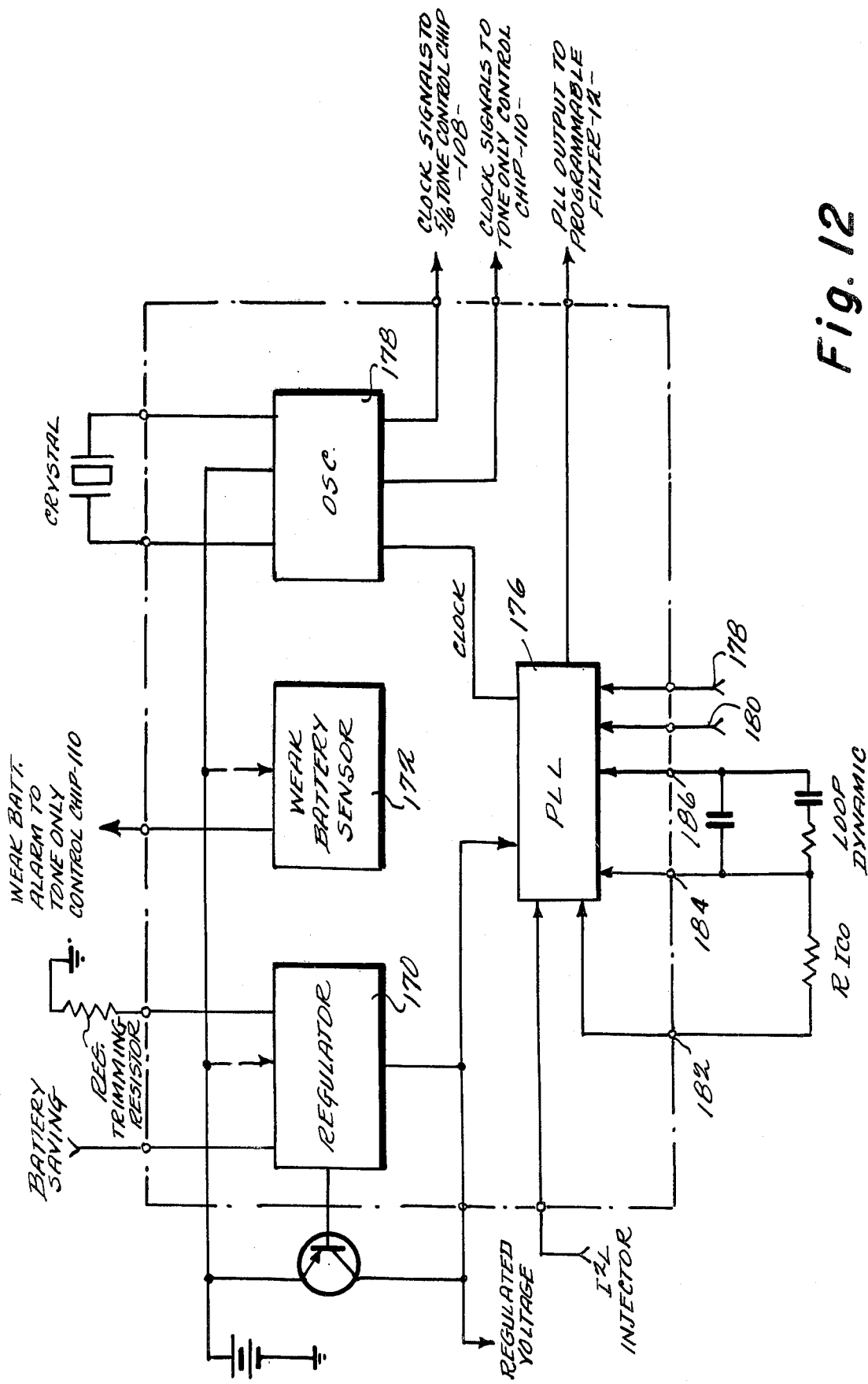
FIG. 12 is a more detailed block diagram of the system linear chip shown in FIG. 6.

FIG. 12 is a more detailed block diagram of system linear chip 112. As previously stated, system linear chip 112 performs all of the linear paging receiver functions. It includes a regulator 170 for regulating the battery supply voltage to 0.9 volts ±3 mV. A weak battery sensor circuit 172 detects the voltage of the battery and generates an alarm control signal when the battery voltage drops below a predetermined threshold, typically 1.1 V. Weak battery sensor circuit 172 includes a voltage comparator for comparing the battery voltage to the 0.9 V regulated voltage from regulator 170. The output of the comparator is low whenever the battery voltage battery is above 1.1 V and its output is high whenever the battery voltge drops below 1.1 V. The output of weak battery sensor 172 is directly $I^2L$ interfaced to tone only control chip 110 via line 160 (see FIG. 6). An oscillator circuit 178 provides clock pulses at a frequency of 32.768 kHz for the 5/6 tone control chip 108. Oscillator 178 must be operating at all times after the paging receiver is turned on. Therefore, it is driven directly from the battery. Oscillator 178 includes three clock signal outputs. One of these outputs is coupled directly to a phase locked loop circuit within system linear chip 112. The second of these clock signal outputs is coupled to 5/6 tone control chip 108, and the third of these clock signal outputs is coupled to tone only control chip 110.

System linear chip 112 includes a phase locked loop circuit (PLL) 176 for generating high frequency clock pulses for programmable filter 12. The output frequency of PLL 176 can be programmed to 1 to 4 frequencies (65.5 kHz, 98.3 kHz, 131 kHz and 196.6 kHz) via two programming inputs 178 and 180. PLL 176 includes a current control oscillator which is implemented by seven I²L gates connected as a ring oscillator. The oscillating frequency is controlled by the injector current into this current control oscillator. A high injector circuit yields a smaller gate delay thereby making the current control oscillator oscillate at a higher frequency. Similarly, a small injector current gives rise to a larger gate delay thereby making the current control oscillator oscillate at a lower frequency. The output of the current control oscillator is coupled through a programmable divider to a phase detector. The phase detector is both frequency and phase sensitive and locks when the divided circuit control oscillator frequency is equal to the clock frequency. This prevents the phase locked loop from locking onto harmonics or subharmonics. A charge pump loop filter coupling the output of the phase detector to the current control oscillator functions as an integrator and loop dynamic filter while providing the error control current for the current control oscillator. Loop dynamic control for PLL 176 is provided via inputs 182, 184 and 186.

Referring again to FIG. 6, code plug 14 is essentially a 26 bit recirculating parallel-to-serial convertor on a custom integrated circuit. A six (6) tone address is coded in binary coded decimal (BCD) form requiring 24 bits of programming. Five (5) tone addresses require only 20 bits. Code plug 14 includes programmable diodes which may be selectively shorted using a code plug programmer to permanently store a pager address.

Thus, it will be seen that there has been provided a new and improved paging receiver which is capable of operating with five tone paging signals when a receiver is continuously on, or with six tone signals when a receiver is utilized with a battery saver. In the battery saving condition, a tone preamble is transmitted to activate the selected receiver or receivers. While at first it would appear desirable to strobe for the tone preamble TP before the paging tones T1 through T5, it has been shown that it is more desirable from the standpoint of efficient circuit utilization, to strobe for the signal tones T1 through T5 first, even for the battery saver condition. For example, in a six tone system that uses a batching format messages for pagers having the same preamble are "batched" together so that the preamble need only be sent once for the batch and a serially outputted code plug (as shown in FIG. 10) with the preamble located at the end of the tone sequence, the paging receiver will have to send the preamble programming information from the code plug only once for a single batch of messages (preamble followed by many pages). It is not necessary to read the preamble from the code plug to compare each received tone sequence with its own address such as would be the case where the preamble is located in front of the tone sequence in a serial code plug. In a five tone application without preamble, the system can program all tones without the need for programming for a preamble when the preamble is located at the end of the tone sequence in a code plug. This strobing is very rapid in function 1, since the strobe signals are passed around through the tone slot counter 20 and the control circuit 21 back to the strobe bus 17. Then, the tone preamble TP can be looked for. In the five tone operation, tones T1 through T5 are being looked for in that order, so that the strobing is in the proper condition for rapid operation in the five tone system.

While only one embodiment of the invention has been shown, persons skilled in the art will appreciate that many modifications that can be made. For example, the system can be expanded or contracted to accommodate almost any plurality of tones in a sequence. Likewise, various or different time lengths can be provided for the tone slots, depending upon operating conditions, including signal path noise, or number of paging messages which must be sent, or the filter response times and operating parameters. Different response and detection times may be used. In six tone operation, the frequency of the tone T1 can be different or the same for each paging message, depending on design preferences and system operation. However, using differnt T1 tone frequencies would offset some of the advantages of the battery saving, so that we prefer that for a given tone preamble, the tone T1 have the same frequency for the paging messages to a selected group of paging receivers.

Persons skilled in the logic field will also appreciate the many forms and logic arrangements that can be used for the circuits shown in FIG. 2. For example, the circuits can handle the binary information in a series or parallel arrangement, depending upon the receiver and logic design constraints. Therefore, while the invention has been described with reference to a particular embodiment, it is to be understood that modification may be made without departing from the spirit of the invention or from the scope of the claims.

We claim:

1. An improved paging radio receiver for producing a page output responsive to a predetermined preamble signal followed by a predetermined sequence of N paging signals, where N is any integer greater than one, said receiver comprising:
   a. means for receiving a radio signal modulated by said preamble signal and paging signals;
   b. means for demodulating the preamble and N paging signals from the radio signal;
   c. programmable signal detection means connected to said demodulating means for detecting demodulated preamble and paging signals;
   d. control means, connected to said signal detection means, for first programming said signal detection means for detecting said predetermined sequence of N paging signals, second programming said signal detection means for detecting said predetermined preamble signal, and third, in response to said predetermined preamble signal being detected by said signal detection means, programming said signal detection means for detecting said predetermined sequence of N paging signals; and
   e. means, connected to said control means, for producing said page output in response to said predetermined sequence of N paging signals being detected by said signal detection means as programmed by said control means.

2. The improved paging radio receiver of claim 1 wherein said third programming of said signal detection means for detecting said sequence of N paging signals programs for detecting each successive signal of said sequence in response to the previous signal of said sequence being detected by said signal detection means.

3. The improved paging radio receiver of claim 1 or claim 2 wherein said control means comprises a detachable device that can be programmed to determine each signal of said predetermined sequence of N paging signals and said predetermined preamble signal to which said paging radio receiver will be responsive.

4. The improved paging radio receiver of claim 1 or claim 2 wherein said first programming of said signal detection means for detecting said sequence of N paging signals causes said signal detection means to be responsive in a sequential manner to the signals of said sequence and this sequential cycling of said first programming occurs at a sufficiently rapid rate to prevent detection of said N paging signals, and wherein said second and third programming of said signal detection means causes said signal detection means to be responsive in a sequential manner to said preamble signal and paging signals, and this sequential cycling of the second and third programming occurs at a relatively slower rate than caused by said first programming, and sufficiently slow to permit said signal detection means to detect said signals.

5. The improved paging radio receiver of claim 3 wherein said first programming of said signal detection means for detecting said sequence of N paging signals causes said signal detection means to be responsive in a sequential manner to the signals of said sequence and this sequential cycling of said first programming occurs at a sufficiently rapid rate to prevent detection of said N paging signals, and wherein said second and third programming of said signal detection means causes said signal detection means to be responsive in a sequential manner to said preamble signal and paging signals, and this sequential cycling of the second and third programming occurs at a relatively slower rate than caused by said first programming, and sufficiently slow to permit said signal detection means to detect said signals.

6. The improved paging radio receiver of claim 1 or 2 further comprising battery saving means for periodically activating said paging radio receiver at intervals less than the time duration of said predetermined preamble signal.

7. The improved paging radio receiver of claim 3 further comprising battery saving means for periodically activating said paging radio receiver at intervals less than the time duration of said predetermined preamble signal.

8. The improved paging radio receiver of claim 4 further comprising battery saving means for periodically activating said paging radio receiver at intervals less than the time duration of said predetermined preamble signal.

9. The improved paging radio receiver of claim 5 further comprising battery saving means for periodically activating said paging radio receiver at intervals less than the time duration of said preamble signal.

10. An improved radio paging receiver for producing a page in response to a preamble signal of a first time duration followed by a sequence of N paging signals, each of said N paging signals having a second time duration shorter than said first time duration, where N is an integer of at least two, said paging receiver comprising:
   a. means for activating said paging receiver;
   b. means for receiving a radio signal modulated by said preamble and paging signals;
   c. means for demodulating the preamble and paging signals
   d. programmable signal detection means connected to said demodulating means for detecting demodulated preamble and paging signals;
   e. means, connected to said programmable signal detection means, for programming said signal detection means to be responsive in a predetermined manner and comprising:
   1. means, responsive to said paging receiver being activated, for causing said signal detection means to be responsive in a sequential manner to each of said N paging signals for an interval of time sufficiently shorter than said second time duration of each of said paging signals to prevent detection of said N paging signals;
   2. means, responsive to completion of said sequence caused by said means of clause e1, for causing said signal detection means to be responsive to said preamble signal during two different time periods, each such time period being sufficiently long to permit detection of said preamble signal;
   3. means, responsive to the detection of said preamble signal during said two different time periods for causing said signal detection means to be responsive to the first signal of said sequence of N paging signals for a time interval sufficiently long to permit detection of said first signal of said sequence of N paging signals;
   4. means, responsive to the detection of a previous signal of said sequence of N paging signals during its respective time interval, for causing said signal detection means to be responsive to each successive signal of said sequence of N paging signals for a time interval sufficiently long to permit detection of each of said signals of said sequence of N paging signals; and
   f. output means connected to said signal detection means and to said programming means for producing a page in response to the presence of the last successive signal in said sequence of N paging signal during its respective time interval.

11. The improved paging receiver of claim 10 further comprising means for deactivating said paging radio receiver in response to a failure by said programmable signal detection means to detect said preamble signal at the end of said two time periods.

12. The improved paging receiver of claim 10 further comprising means for deactivating said paging radio receiver in response to the failure by said programmable signal detection means to detect said first signal of said sequence of N paging signals at the end of its associated time interval.

13. The improved radio paging receiver of claim 10 further comprising means for deactivating said paging radio receiver in response to the failure by said programmable signal detection means to detect said first signal of said sequence of N paging signals during a predetermined time period following a failure by said programmable signal detection means to detect any other paging signal of said sequence of N paging signals during its respective time interval.

14. The improved paging receiver of claim 10 further comprising:
   means for deactivating said paging radio receiver in response to the failure by said programmable signal detection means to detect said preamble signal at the end of said two time periods, and
   means for deactivating said paging radio receiver in response to the failure by said programmable signal detection means to detect said first paging signal of said sequence of N paging signals during said third time interval.

15. The improved paging receiver of claim 10 further comprising:

means for deactivating said paging radio receiver in response to the failure by said programmable signal detection means to detect said preamble signal at the end of said two time periods, and means for deactivating said paging radio receiver in response to the failure by said programmable signal detection means to detect said first paging signal of said sequence of N paging signals during a predetermined time period following a failure by said programmable signal detection means to detect any other paging signal of said sequence during its respective time interval.

16. The improved paging receiver of claim 10 further comprising:

means for deactivating said paging radio receiver in response to the failure by said programmable signal detection means to detect said first paging signal during its associated time interval, and means for deactivating said paging radio receiver in response to the failure by said programmable signal detection means to detect said first paging signal after a predetermined time period following a failure by said programmable signal detection means to detect any other paging signal of said sequence during its respective time interval.

17. The improved paging receiver of claim 10 further comprising:

means for deactivating said paging radio receiver in response to the failure by said programmable signal detection means to detect said preamble signal at the end of said two time periods, means for deactivating said paging radio receiver in response to the failure by said programmable signal detection means to detect said first paging signal during its associated time interval, and means for deactivating said paging radio receiver in response to the failure by said programmable signal detection means to detect said first paging signal after a predetermined time period following a failure by said programmable signal detection means to detect any other paging signal of said sequence during its respective time interval.

18. The improved radio paging receiver of any of claims 10, 11, 12, 13, 14, 15, 16, or 17 wherein said means for activating comprises means for periodically and recurrently activating said paging radio receiver at intervals less than the duration of said preamble signal.

19. A method for selectively programming a radio receiver to be receptive to a predetermined preamble signal followed by a plurality of sequential predetermined paging signals, comprising the steps of:

a. first causing said receiver to be receptive in a sequential manner to said plurality of sequential predetermined paging signals at a first rate sufficiently rapid to prevent detection of said paging signals;

b. second causing said receiver to be receptive to said predetermined preamble signal; and c. third, in response to detection of said predetermined preamble signal, causing said receiver to be receptive in a sequential manner to said plurality of predetermined paging signals at a second rate slower than said first rate said second rate being sufficiently slow to permit detection of said paging signals.

20. The method of claim 19 wherein said third step causes said receiver to be receptive to each predetermined paging signal in said paging signal sequence in response to detection of the previous predetermined paging signal in said paging signal sequence.

21. An improved paging receiver according to claim 1 wherein said preamble signal is a tone signal.

22. An improved paging receiver according to claim 1 wherein said paging signals are tone signals.

23. An improved paging receiver according to claim 1 wherein said preamble paging signals are tone signals.

24. An improved paging receiver according to claim 2 wherein said preamble signal is a tone signal.

25. An improved paging receiver according to claim 2 wherein said paging signals are tone signals.

26. An improved paging receiver according to claim 2 wherein said preamble and paging signals are tone signals.

27. An improved paging receiver according to claim 3 wherein said preamble signal is a tone signal.

28. An improved paging receiver according to claim 3 wherein said paging signals are tone signals.

29. An improved paging receiver according to claim 3 wherein said preamble and paging signals are tone signals.

30. An improved paging receiver according to claim 4 wherein said preamble signal is a tone signal.

31. An improved paging receiver according to claim 4 wherein said paging signals are tone signals.

32. An improved paging receiver according to claim 4 wherein said preamble and paging signals are tone signals.

33. An improved paging receiver according to claim 5 wherein said preamble signal is a tone signal.

34. An improved paging receiver according to claim 5 wherein said paging signals are tone signals.

35. An improved paging receiver according to claim 5 wherein said preamble and paging signals are tone signals.

36. An improved paging receiver according to claim 8 wherein said preamble signal is a tone signal.

37. An improved paging receiver according to claim 8 wherein said paging signals are tone signals.

38. An improved paging receiver according to claim 8 wherein said preamble and paging signals are tone signals.

39. A paging radio receiver according to any of claims 10, 11, 12, 13, 14, 15, 16, or 17 wherein said preamble signal is a tone signal.

40. A paging radio receiver according to claims 10, 11, 12, 13, 14, 15, 16, or 17 wherein said paging signals are tone signals.

41. A paging radio receiver according to any of claims 10, 11, 12, 13, 14, 15, 16, or 17 wherein said preamble and paging signals are tone signals.

42. A paging radio receiver according to claim 18 wherein said preamble signal is a tone signal.

43. A paging radio receiver according to claim 18 wherein said paging signals are tone signals.

44. A paging radio receiver according to claim 18 wherein said preamble and paging signals are tone signals.

45. A battery saving paging receiver for producing a page in response to a predetermined sequential signal code having at least first, second, and third signals comprising:

a receiver for receiving and detecting said signals;

a battery saver coupled to said receiver for supplying operating power thereto after a predetermined interval of time during which operating power was not applied;

first means for detecting said first signal;

second means, responsive to the detection of said first signal, for thereafter detecting the termination of said first signal and establishing, in response to said termination, a first time window related to the termination of said first signal;

third means for detecting said second signal during said first time window and for establishing, in response to the detection of said second signal during said first time window, a second time window related to said first time window;

fourth means for detecting said third signal during said second time window and producing, in response thereto, a page;

fifth means, responsive to a failure to detect said third signal during said second time window, for establishing a third time window for the detection of said second signal and sixth means, responsive to a failure to detect said second signal during said third time window, for turning off said battery saver to eliminate power to said receiver.

46. A battery saving paging receiver according to claim 45 wherein said first time window is larger than said second time window but is smaller than said third interval of time window.

47. A battery saving paging receiver according to either of claims 45 or 46 wherein said first, second, and third signals are tones.

48. A paging receiver operable in either a first battery save mode or a second mode, said first battery save mode of operation for responding to a predetermined preamble signal followed by a predetermined sequence of paging signals and said second mode of operation for responding to said predetermined sequence of paging signals only, comprising:

first means for selecting one of said two modes of operation;

a battery saver circuit for applying power from a power source to selected circuits of said paging receiver after each period of removed power occurring for a predetermined first interval of time and for removing power from said selected circuits in response to a battery saver control signal;

second means, responsive to the selection of said first mode by said means for selecting, for causing said battery saver circuit to apply power to the selected circuits means for receiving said preamble and paging signals, programmable signal detection means, coupled to said means for receiving, for selectively detecting the presence of said preamble and paging signals;

third means, responsive to the application of power by said battery saver circuit, for causing said signal detection means to be responsive to said preamble signal;

fourth means, responsive to the detection of said preamble signal for detecting the end of said preamble signal;

fifth means, responsive to the detection of the end of said preamble signal by said fourth means, for detecting the first paging signal of said predetermined sequence;

sixth means, responsive to the detection of the first paging signal of said sequence for causing said signal detection means to be sequentially responsive to each of the second through last paging signal of said sequence;

seventh means, responsive to the detection of all of the paging signals of said predetermined sequence, for producing a page;

eighth means, responsive to a failure to detect any of the second through last paging signals of said sequence, for causing said signal detection means to be responsive during a second time interval to the first paging signal of said sequence;

ninth means, responsive to a detection of the first paging signal during said second time interval, for causing said signal detection means to be sequentially responsive to each of the second through last paging signals of said sequence;

tenth means, responsive to a failure to detect the first paging signal during the second time interval, for generating said battery saver control signal to turn off the battery saver circuit;

eleventh means, responsive to the selection of said second mode for supplying power to the receiver and causing said signal detection means to be responsive to the first paging signal of said sequence until the first paging signal is detected;

twelfth means, responsive to the detection of the first signal by said eleventh means, for causing said signal detection means to be sequentially responsive to each of the second through last paging signals of said sequence; and thirteenth means, responsive to the selection of said second mode and to a failure to detect by said twelfth means of any of the second through last paging signals of said sequence, for causing said signal detection means to be responsive to the first signal of said sequence.

49. A paging receiver according to claim 48 wherein said preamble signal is a tone signal.

50. A paging receiver according to claim 48 wherein said paging signals are tone signals.

51. A paging receiver according to claim 48 wherein said preamble signal and said paging signals are tone signals.

52. A paging radio receiver for receiving a preamble signal having a predetermined period followed by a predetermined sequence of paging signals and providing an indication of such reception, comprising:

means, normally unpowered, for receiving, when powered, the predetermined preamble and paging signals;

a programmable detection means coupled to said means for receiving;

control means, coupled to said programmable detection means for, (a) programming the detection means to be responsive to the predetermined sequence of paging signals, the sequencing resulting from the first programming occurring at a rate sufficiently rapid to prevent detection of said paging signals, (b) programming the detection means to be responsive to the predetermined preamble signal, (c) detecting the end of the predetermined preamble signal, and (d) in response to the end of the predetermined preamble signal being detected by the detection means, for programming the detection means to be responsive to the predetermined sequence of paging signals;

means, coupled to said control means, for providing a page in response to detection of the predetermined sequence of paging signals by said detection means; and means for periodically applying power to said means for receiving the application of power occurring at intervals of time less than the predetermined period of the preamble signal.

53. A paging radio receiver according to claim 52 wherein said predetermined preamble and paging signals are tones and said programmable detection means is a programmable filter.

54. A battery saving paging receiver for producing a page in response to a predetermined sequential signal code having at least first, second, and third signals comprising:

a receiver for receiving and detecting said signals;

a battery saver coupled to said receiver for providing operating power thereto after a predetermined interval of time during which operating power was not applied;

first means coupled to said receiver and battery saver for detecting said first signal when power is supplied by said battery saver after said predetermined interval of time;

second means, responsive to the detection of said first signal, for thereafter again detecting the presence of said first signal;

third means for detecting the end of said first signal and establish a first time window;

fourth means for detecting said second signal during said first time window and for establishing, in response to the detection thereof, a second time window;

fifth means for detecting said third signal during said second time window and producing, in response to the sequential detection of at least said first, second and third signals a page;

sixth means, responsive to a failure to detect said third signal within said second time window, for detecting the presence of said second signal during a third time window; and seventh means, responsive to a failure to detect said second signal within said third time window, for turning off said battery saver to eliminate power to said receiver.

55. A battery saving paging receiver according to claim 54 wherein said interval of time during which operating power is not supplied is larger than said second time window but is smaller than said third time window.

56. A battery saving paging receiver according to either of claims 54 and 55 wherein said first, second, and third signals are tones.

57. The improved paging radio receiver of claim 1 or claim 2 wherein said first programming further comprises means for preventing detection of said N paging signals, and wherein said second and third programming of said signal detection means causes said signal detection means to be sequentially responsive to said preamble signal and paging signals, permitting said signal detection means to detect said signals.

58. A method for selectively programming a radio receiver to be receptive to a predetermined preamble signal followed by a plurality of sequential predetermined paging signals, comprising the steps of:

a. first programming said receiver to be receptive to said predetermined preamble signal;

b. second, in response to detection of the presence of said predetermined preamble signal at given time instants, detecting the end of said predetermined preamble signal; and c. after detecting the end of said preamble signal, programming said receiver in a sequential manner to be receptive to said plurality of predetermined paging signals.

59. A method according to claim 58 wherein said step (c) comprises: in response to detection of the end of said predetermined preamble signal, programming the receiver to be receptive to the first following paging signal and therafter receptive to each succeeding paging signal in response to detection of the previous paging signal.

60. A method for producing pages in response to sequential signals of either a first or second paging signal format, said first format comprising a predetermined preamble signal followed by a plurality of sequential predetermined paging signals and said second format comprising only said sequential predetermined paging signals without a preamble, received by a receiver comprising:

programming said receiver in a sequential manner to be receptive in a sequential manner to either format of said plurality of sequential predetermined paging signals at a first rate sufficiently rapid to prevent detection of said paging signals, programming said receiver to be receptive to said preamble signal; and upon detection of said preamble, programming said receiver in a sequential manner to be receptive to said plurality of sequential predetermined paging signals at a second rate slower than said first rate to permit detection of said paging signals.

61. An arrangement for producing an output reponsive to a predetermined first signal followed by a predetermined second signal which are among a plural sequence of signals available from a source, comprising:

programmable signal detection means, coupled to said source, for receiving signals therefrom;

control means connected to said signal detection means for (i) first serially programming said signal detection means for enabling sequential detection of the plural sequence of signals comprising said second signal, (ii) second, serially programming said signal detection means for detecting said first signal, and (iii) third, in response to said first signal being detected by said signal detection means, serially programming said signal detection means for sequentially detecting the plural sequence comprising said second signal, and means connected to said control means for producing said output in response to said second signal being detected by said signal detection means after the serial programming of (iii); wherein said first programming of said signal detection means for enabling said plural sequence of signals causes said signal detection means to be responsive in a sequential manner to the signals of said sequence and this sequential responsiveness of said first programming occurs at a first rate to prevent detection of said plural sequence of signals, and wherein said second and third programming of said signal detection means causes said signal detection means to be responsive in a sequential manner to said first signal and second signal, and this sequential responsiveness of the second and third programming occurs at a second and third rate respectively to permit said signal detection means to detect said first and second signals.

62. An arrangement according to claim 61 wherein said third programming of said signal detection means for detecting said second signal programs for detecting each successive signal of said plural sequence of signals in response to the previous signal of said sequence being detected by said signal detection means.

63. An arrangement according to claim 62 or 61 wherein said control means comprises a changeable, selectively programmable device to determine each signal of said plural sequence signals and said first signal to which said arrangement will be responsive.

64. An arrangement according to claim 63 wherein said changeable, selectively programmable device is a code plug from which data is read serially.

65. An arrangement according to claim 62 or 61 further comprising battery saving means for periodically activating said source at intervals less than the time duration of said first signal.

66. An arrangement according to claim 61 wherein said second and third rates are identical and said first rate is greater than said second and third rates.

67. A radio receiver responsive to a predetermined sequence of received address signals, comprising:
   means for receiving radio frequency signals and for detecting intelligence bearing signals carried therewith;
   means for comparing said intelligence-bearing signals with a supplied comparison signal and for generating an output signal indicative of the signal comparison result; and
   serial code plug means for supplying a predetermined serial sequence of said comparison signals to said means for comparing, wherein said intelligence bearing signals comprise a preamble signal followed by a sequence of address signals and wherein said predetermined serial sequence of comparison signals comprise a sequence of predetermined address signals followed by a predetermined preamble signal and including means for causing said serial code plug means to rapidly output said sequence of predetermined address signals upon its initial activation.

68. A radio receiver as in claim 67 further including means for causing said serial code plug means to output said sequence of predetermined address signals responsive to a subsequent actuation at a rate less than that responsive to said initial actuation.

69. A radio receiver as in claim 67 wherein said predetermined serial sequence comprises five (5) signals.

70. A radio receiver as in claim 67 wherein the output of the serial code plug responsive to said initial actuation is so rapid that the comparing means cannot detect the intelligence bearing signals.

71. A radio receiver as in claim 68 wherein the slower rate of serial code plug output responsive to a subsequent actuation is sufficiently slow to permit a comparison by said comparing means.

72. A paging receiver having a unique address comprising a predetermined sequence of paging signals, for use in a paging system including a plurality of such receivers, comprising;
   means for receiving address messages; and
   means or comparing the received address messages with its unique address and actuating an alarm if the unique address is received; the comparing means comprising a digital signal detector for determining the presence or absence of a particular paging signal during a predetermined interval of time; and a serial code plug for programming the signal detector to be responsive to the paging signals in a predetermined manner, wherein the unique address comprises a preamble signal followed by a predetermined sequence of paging signals and wherein the serial code plug is arranged to (a) first rapidly program the signal detector at such a rate that paging signals cannot be detected, then (b) program the signal detector to detect the preamble signal.

73. A paging receiver according to claim 72 wherein the serial code is further arranged to (c) after step (b), program the signal detector at a sufficiently slow rate to be responsive to the predetermined sequence of paging signals.

74. A paging receiver as in claim 72 wherein the address comprises a sequence of five (5) paging signals.

75. A paging receiver as in claim 72 wherein the address comprises a preamble signal followed by a sequence of five (5) paging signals.

* * * * *

UNITED STATES PATENT OFFICE
CERTIFICATE OF CORRECTION

Patent No. 4,417,246  Dated November 22, 1983

Inventor(s) William C. Agnor, James H. Elder

It is certified that error appears in the above-identified patent and that said Letters Patent are hereby corrected as shown below:

Col. 8, line 13, after "X-tone" cancel "selects"
　　　　line 14, after "to" insert -- select --
Col. 13, line 4, cancel "fine" and insert -- find --
Col. 16, line 11, cancel "differnt" and insert -- different --
Col. 20, line 8, after "preamble" insert -- and --
Col. 25, line 5 of claim 62, cancel "for", second occurrence, and insert -- includes --.

Signed and Sealed this

Thirty-first Day of July 1984

[SEAL]

Attest:

GERALD J. MOSSINGHOFF

Attesting Officer　　Commissioner of Patents and Trademarks